United States Patent
Park et al.

(10) Patent No.: US 9,888,493 B2
(45) Date of Patent: Feb. 6, 2018

(54) MULTI-POINT COORDINATION METHOD FOR RECEIVING UPLINK DATA IN WIRELESS COMMUNICATION SYSTEM AND APPARATUS PERFORMING SAME

(71) Applicant: LG ELECTRONICS INC., Seoul (KR)

(72) Inventors: Jonghyun Park, Seoul (KR); Kijun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 81 days.

(21) Appl. No.: 14/894,891

(22) PCT Filed: Sep. 5, 2014

(86) PCT No.: PCT/KR2014/008376
§ 371 (c)(1),
(2) Date: Nov. 30, 2015

(87) PCT Pub. No.: WO2015/037885
PCT Pub. Date: Mar. 19, 2015

(65) Prior Publication Data
US 2016/0119947 A1    Apr. 28, 2016

Related U.S. Application Data

(60) Provisional application No. 61/878,557, filed on Sep. 16, 2013.

(51) Int. Cl.
*H04W 4/00* (2009.01)
*H04W 72/12* (2009.01)
(Continued)

(52) U.S. Cl.
CPC ........ *H04W 72/1289* (2013.01); *H04B 7/024* (2013.01); *H04L 5/0055* (2013.01)

(58) Field of Classification Search
CPC ...... H04W 72/04; H04W 88/08; H04W 76/00
See application file for complete search history.

(56) References Cited

U.S. PATENT DOCUMENTS

| | | | |
|---|---|---|---|
| 2011/0113299 A1* | 5/2011 | Power | H04L 1/18 714/748 |
| 2011/0280133 A1* | 11/2011 | Chang | H04L 1/0052 370/241 |

(Continued)

OTHER PUBLICATIONS

3GPP TSG-RAN WG1 Meeting #74, Signalling for inter-eNB operation, Aug. 19-23, 2013, R1-133050.*
(Continued)

*Primary Examiner* — Siren Wei
(74) *Attorney, Agent, or Firm* — Birch, Stewart, Kolasch & Birch, LLP

(57) ABSTRACT

A method for performing multi-point coordination for receiving uplink data by a serving point in accordance with an embodiment of the present invention comprises the steps of: scheduling physical uplink shared channel (PUSCH) transmission of a served terminal by the serving point; transmitting a message including at least a part of a scheduling result of the PUSCH transmission to a coordinated point; and after transmission of the message, transmitting downlink control information including the scheduling result of the PUSCH transmission to the terminal, wherein the PUSCH of the terminal scheduled by the serving point is received by the coordinated point which has obtained the message.

19 Claims, 14 Drawing Sheets

(51) Int. Cl.
  *H04B 7/024* (2017.01)
  *H04L 5/00* (2006.01)

(56) References Cited

U.S. PATENT DOCUMENTS

| | | | |
|---|---|---|---|
| 2012/0176887 A1 | 7/2012 | McBeath et al. | |
| 2012/0201202 A1* | 8/2012 | Hong | H04L 1/1854 370/328 |
| 2012/0327830 A1* | 12/2012 | Hamaguchi | H04J 11/003 370/311 |
| 2013/0039198 A1* | 2/2013 | Isojima | H04L 1/1861 370/252 |
| 2013/0083751 A1* | 4/2013 | Papasakellariou | H04L 1/1854 370/329 |
| 2013/0329660 A1* | 12/2013 | Noh | H04L 5/0035 370/329 |
| 2014/0293881 A1* | 10/2014 | Khoshnevis | H04L 5/0048 370/329 |

OTHER PUBLICATIONS

CMCC, "Inter-eNB Signalling in support of CoMP with Non-ideal Backhaul," 3GPP TSG-RAN WG1 #74, R1-133529, Barcelona, Spain, Aug. 19-23, 2013, pp. 1/4-4/4.

LG Electronics, "Inter-eNB signaling for semi-static CoMP operations," 3GPP TSG RAN WG1 Meeting #74, R1-133391, Barcelona, Spain, Aug. 19-23, 2013, 4 pages.

Samsung, "Discussion on Signalling for Inter-eNB CoMP Operation," 3GPP TSG RAN WG1 #74, R1-133124, Barcelona, Spain, Aug. 19-23, 2013, 4 pages.

ZTE, "Signalling for inter-eNB operation," 3GPP TSG-RAN WG1 Meeting #74, R1-133050, Barcelona, Spain, Aug. 19-23, 2013, pp. 1/4-4/4.

* cited by examiner (a) control-plane protocol stack (b) user-plane protocol stack

MULTI-POINT COORDINATION METHOD FOR RECEIVING UPLINK DATA IN WIRELESS COMMUNICATION SYSTEM AND APPARATUS PERFORMING SAME

CROSS REFERENCE TO RELATED APPLICATIONS

This application is the National Phase of PCT International Application No. PCT/KR2014/008376, filed on Sep. 5, 2014, which claims priority under 35 U.S.C. 119(e) to U.S. Provisional Application No. 61/878,557, filed on Sep. 16, 2013, all of which are expressly incorporated by reference into the present application.

TECHNICAL FIELD

The present invention relates to a wireless communication system and, more specifically, to a method for multiple points to perform CoMP in order to receive uplink data and an apparatus for performing the same.

BACKGROUND ART

3GPP LTE (3rd generation partnership project long term evolution) and LTE-A (LTE-advanced) will now be described as an exemplary mobile communication system to which the present invention is applicable.

FIG. 1 illustrates E-UMTS (evolved universal mobile telecommunication system) as an exemplary mobile communication system. E-UMTS evolved from UMTS (universal mobile telecommunication system) is currently standardized in 3GPP. E-UMTS may be regarded as an LTE system. For technical specifications of UMTS and E-UMTS, reference can be made to Release 8 and Release 9 of "3rd Generation Partnership Project; Technical Specification Group Radio Access Network".

Referring to FIG. 1, E-UMTS includes a user equipment (UE), a base station (BS) and an access gateway (AG) located at the end of a network (E-UTRAN) and connected to an external network. The BS can simultaneously transmit multiple data streams for multicast service, and/or unicast service.

One or more cells are present in a BS. A cell is set to one of bandwidths of 1.25, 2.5, 5, 10, 15 and 20 MHz and provides downlink or uplink service to a plurality of UEs. Different cells may provide different bandwidths. The BS controls data transmission/reception to/from a plurality of UEs. The BS transmits downlink scheduling information about downlink data to the UE to inform the UE of a time/frequency region in which data will be transmitted, coding, data size, hybrid automatic repeat and request (HARQ) related information, etc. In addition, the BS transmits uplink scheduling information about uplink data to the UE to inform the UE of a time frequency region that can be used by the UE, coding, data size, HARQ related information, etc. An interface for user traffic or control traffic transmission may be used between BSs. A core network (CN) may be composed of a network node for user registration of the AG and UE. The AG manages mobility of the UE for each tracking area (TA) composed of a plurality of cells.

While wireless communication technology has been developed to LTE on the basis of wideband code division multiple access (WCDMA), demands and expectations of users and service providers continuously increase. Furthermore, new wireless access technologies are continuously developed, and thus technical evolution is needed to achieve competitiveness. That is, reduction in cost per bit, service availability increase, flexible use of frequency bands, simple structure and open interface, appropriate power consumption of a UE, etc. are required.

DISCLOSURE

Technical Problem

An object of the present invention devised to solve the problem lies in a method by which multiple transmission points cooperatively receive uplink data in an environment in which a backhaul link between the multiple transmission points has latency, and an apparatus for performing the same.

The technical problems solved by the present invention are not limited to the above technical problems and those skilled in the art may understand other technical problems from the following description.

Technical Solution

In an aspect of the present invention, a method of performing coordinated multi-point (CoMP) operation for receiving uplink data by a serving point comprises scheduling physical uplink shared channel (PUSCH) transmission of a UE served by the serving point; transmitting a message including at least part of a result of scheduling the PUSCH transmission to a coordinated point; and transmitting downlink control information including the result of scheduling the PUSCH transmission to the UE after transmitting the message, wherein the PUSCH of the UE scheduled by the serving point is received by the coordinated point which has obtained the message.

In another aspect of the present invention, a serving point performing a coordinated multi-point (CoMP) operation for receiving uplink data, comprises a processor configured to schedule PUSCH transmission of a user equipment (UE) served by the serving point; a backhaul interface configured to transmit, to a coordinated point, a message including at least part of a result of scheduling the PUSCH transmission; and a radio frequency (RF) interface configured to transmit, to the UE, downlink control information including the result of scheduling the PUSCH transmission after transmitting the message, wherein the PUSCH of the UE scheduled by the serving point is received by the coordinated point which has obtained the message.

In another aspect of the present invention, a method of performing coordinated multi-point (CoMP) operation for receiving uplink data by a coordinated point, comprises receiving a physical uplink shared channel demodulation reference signal (PUSCH DMRS) configuration which is radio resource control (RRC) configured in a user equipment (UE) served by a serving point; receiving a scheduling result of PUSCH transmission of the UE; receiving the PUSCH on based on the scheduling result of PUSCH transmission; and decoding the received PUSCH using the PUSCH DMRS configuration.

In another aspect of the present invention, a coordinated point performing a CoMP operation for receiving uplink data, comprises a backhaul interface configured to receive a physical uplink shared channel demodulation reference signal (PUSCH DMRS) configuration which is radio resource control (RRC) configured in a user equipment (UE) served by a serving point and to receive a scheduling result of PUSCH transmission of the UE; an radio frequency (RF)

interface configured to receive the PUSCH on based on the scheduling result of PUSCH transmission; and a processor configured to decode the received PUSCH using the PUSCH DMRS configuration.

Advantageous Effects

According to an embodiment of the present invention, multiple transmission points can cooperatively receive uplink data in an environment in which a backhaul link between the multiple transmission points has latency.

The effects of the present invention are not limited to the above-described effects and other effects which are not described herein will become apparent to those skilled in the art from the following description.

BEST MODE

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

Also, the description of the eNB given above may be equally applied to a case in which a cell, an antenna port, an antenna port group, an RRH, a transmission point, a reception point, an access point, and a relay serve as a downlink transmit entity or an uplink receive entity with respect to the UE.

Protocol Stack

Figure 1:
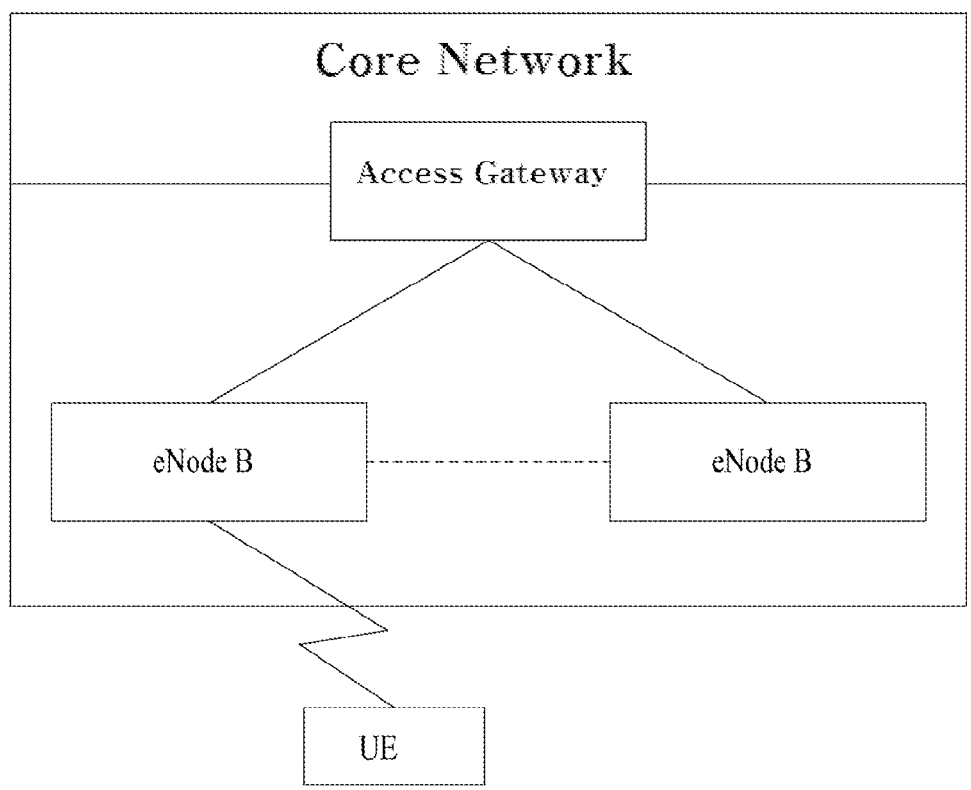
FIG. 1 illustrates an E-UMTS network architecture as an exemplary mobile communication system.
Figure 2:
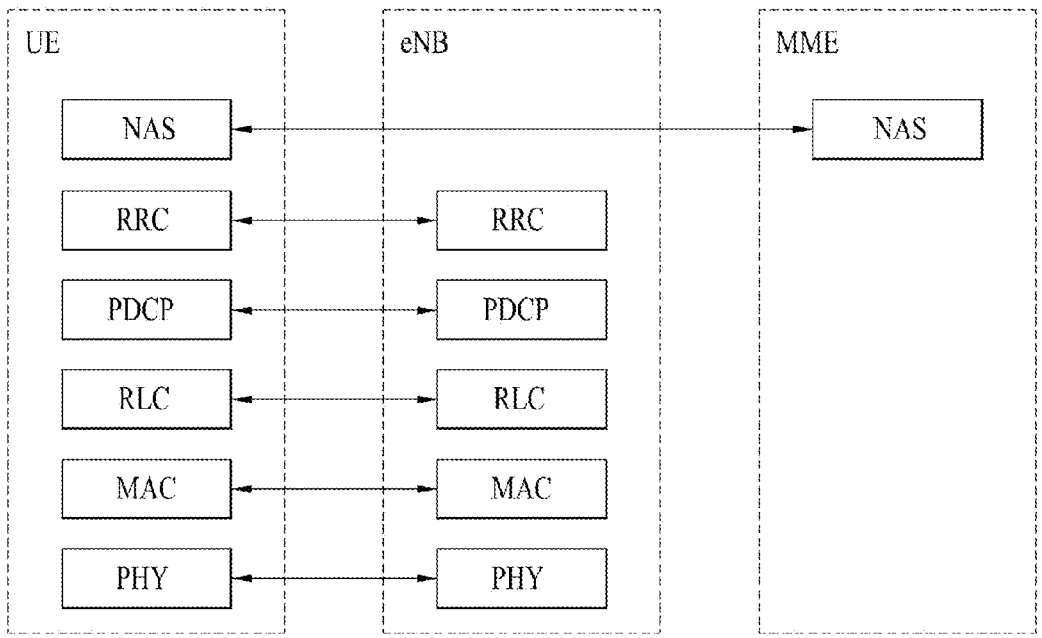
FIG. 2 illustrates control plane and user plane structures of a radio interface protocol between a UE and an E-UTRAN based on 3GPP radio access network standards.
Figure 2:
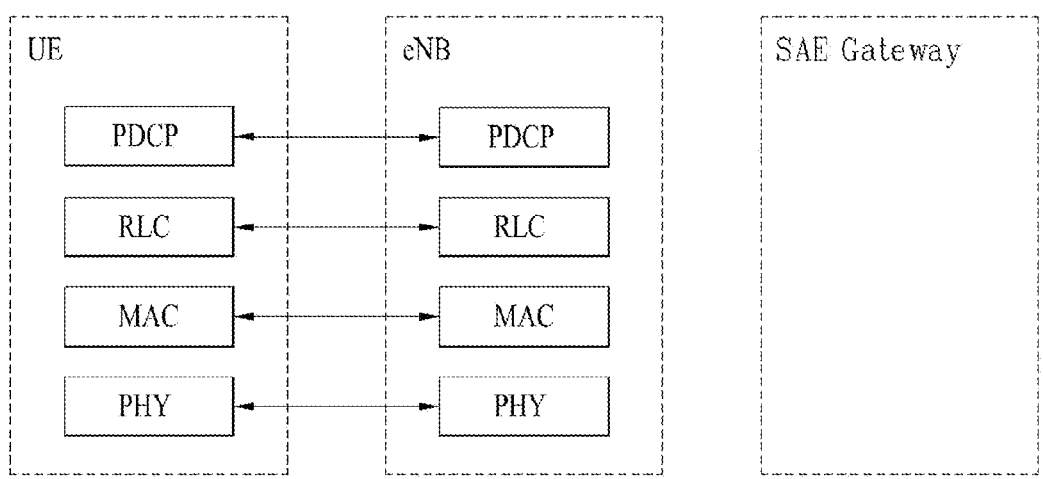

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages, which are used for managing a call between the UE and the network. The user plane refers to a path used for transmitting data generated in an application layer, e.g., voice data or Internet packet data.

A physical (PHY) layer of a first layer provides an information transfer service to an upper layer using a physical channel. The PHY layer is connected to a Medium Access Control (MAC) layer on an upper layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. In detail, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively narrow bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Physical Layer Procedure

Figure 3:
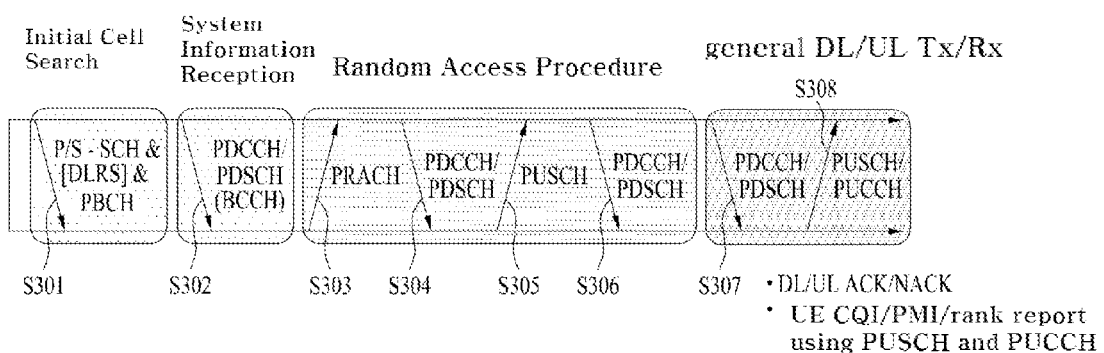
FIG. 3 illustrates physical channels used for a 3GPP system and a general signal transmission method using the physical channels.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and Physical Uplink Shared Channel (PUSCH)/Physical Uplink Control Channel (PUCCH) transmission (S308) as a general uplink/downlink signal transmission procedure. The UE receives Downlink Control Information (DCI) via PDCCH. Here the DCI includes control information such as resource allocation information, and the format of the DCI can be determined according to usages.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Frame Structures

Figure 4:
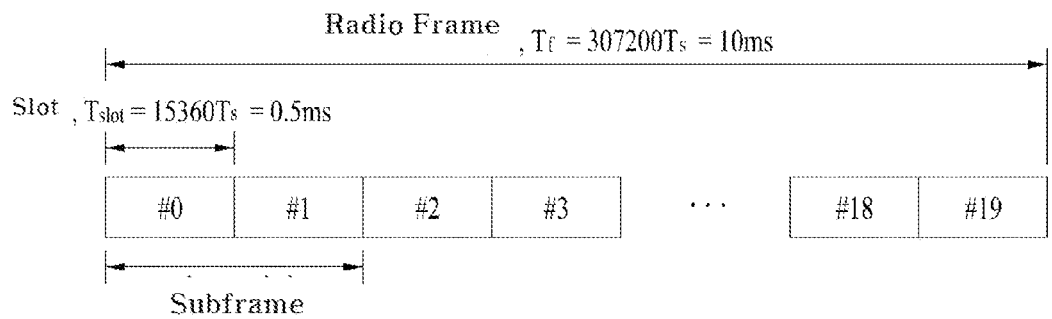
FIG. 4 illustrates a radio frame structure used in LTE.

FIG. 4 is a diagram showing the architecture of a radio frame used in Long Term Evolution (LTE).

Referring to FIG. 4, the radio frame has a length of 10 ms ($327200 \cdot T_s$) and includes 10 subframes with the same size. Each of the subframes has a length of 1 ms and includes two slots. Each of the slots has a length of 0.5 ms ($15360 \cdot T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM symbols. A Transmission Time Interval (TTI) which is a unit time for transmission of data may be determined in units of one or more subframes. The architecture of the radio frame is only exemplary and the number of subframes included in the radio frame, the number of slots included in the subframe, or the number of OFDM symbols included in the slot may be variously changed.

Figure 5:
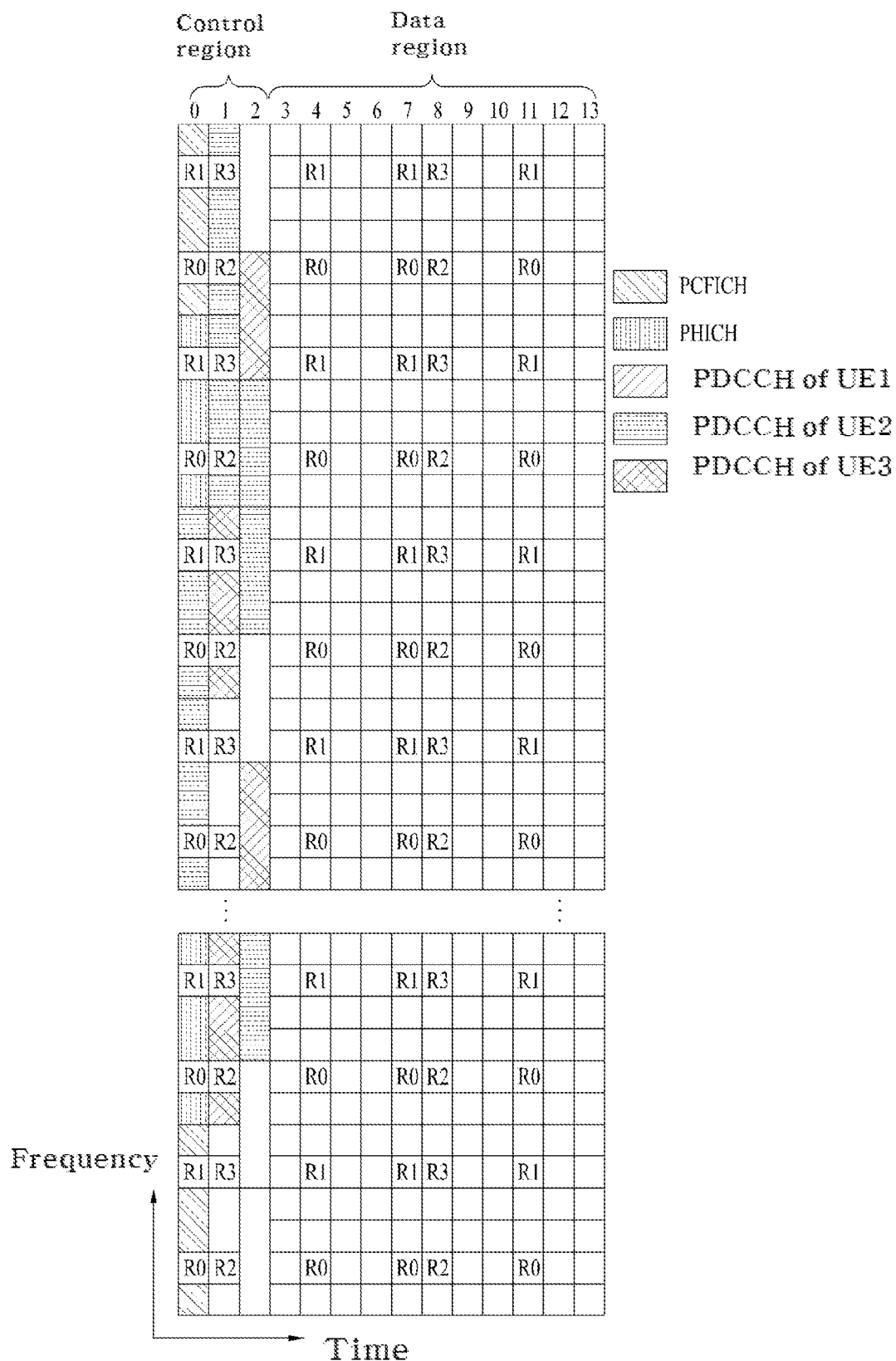
FIG. 5 illustrates a downlink radio frame structure used in LTE.

FIG. 5 is a diagram showing a control channel included in the control region of the subframe.

Referring to FIG. 5, the subframe is composed of 14 OFDM symbols. According to the configuration of the subframe, the first one to three OFDM symbols are used as the control region and the remaining 13 to 11 OFDM symbols are used as the data region. In the drawing, R1 to R4 denote Reference Signals (RS) (or pilot signals) of antennas 0 to 3. The RS is fixed within the subframe with a constant pattern regardless of the control region and the data region. Control channels are resources, to which the RSs are not allocated, in the control region, and traffic channels are allocated to resources, to which the RSs are not allocated, in the data region. The control channels include a Physical Control Format Indicator Channel (PCFICH), a Physical Hybrid-ARQ Indicator Channel (PHICH), a Physical Downlink Control Channel (PDCCH), and the like.

The PCFICH informs the UE of the number of OFDM symbols used in the PDCCH for each subframe. The PCFICH is located at a first OFDM symbol and is set prior to the PHICH and the PDCCH. The PCFICH is composed of four Resource Element Groups (REGs), and the REGs are distributed within the control region based on a cell Identity (ID). One REG is composed of four Resource Elements (REs). The RE refers to a minimum physical resource defined by one subcarrier×one OFDM symbol. The architecture of the REG will be described in detail with reference to FIG. 7. The PCFICH value indicates a value of 1 to 3 or 2 to 4 according to a bandwidth and is modulated using a Quadrature Phase Shift Keying (QPSK) scheme.

The PHICH is used to transfer a HARQ ACK/NACK signal linked to uplink transmission. That is, the PHICH refers to a channel used for transmitting DL ACK/NACK information for UL HARQ. The PHICH is composed of one REG and is scrambled on cell-specific basis. The ACK/NACK signal is indicated by 1 bit and is modulated using a Binary Phase Shift Keying (BPSK) scheme. The modulated ACK/NACK signal is spread using a Spreading Factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain a diversity gain in a frequency domain and/or a time domain.

The PDCCH is allocated to first n OFDM symbols of the subframe. Here, n is an integer of 1 or more and is indicated by the PCFICH. The PDCCH is composed of one or more Control Channel Elements (CCEs), which will be described later in detail. The PDCCH informs UEs or a UE group of information associated with resource allocation of a Paging Channel (PCH) and a Downlink-Shared Channel (DL-SCH) of a transport channel, Uplink scheduling Grant, HARQ information or the like. The PCH and the DL-SCH are transmitted through the PDSCH. Accordingly, the eNB and the UE generally transmit and receive data through the PDSCH except for specific control information or specific service data.

Information indicating to which UE (one or a plurality of UEs) the data of the PDSCH is transmitted and how UEs receive and decode the data of the PDSCH is transmitted through the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, a UE located within a cell monitors a PDCCH using its own RNTI information, and if one or more UEs having "A" RNTI are present, the UEs receive the PDCCH and receive the PDSCH indicated by "B" and "C" through the information about the received PDCCH.

Figure 6:
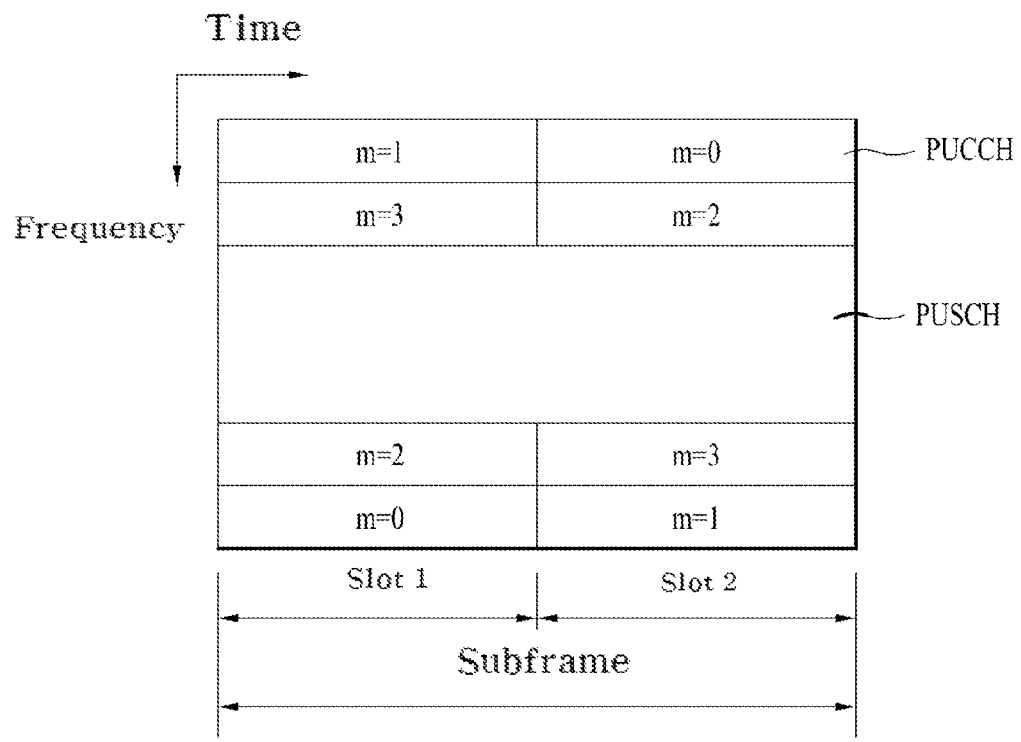
FIG. 6 illustrates an uplink subframe structure used in LTE.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

MIMO (Multi-Input Multi-Output)

Figure 7:
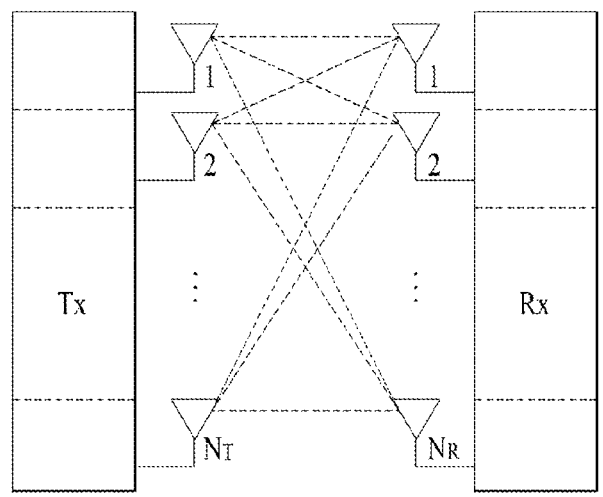
FIG. 7 illustrates a conventional MIMO communication system.

A block diagram of a general multi-antenna (MIMO) communication system is depicted in FIG. 7.

$N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Equation 1. In this case, the $R_i$ is a smaller value of the $N_T$ and the $N_R$.

$$R_i = \min(N_T, N_R) \quad \text{[Equation 1]}$$

For instance, MIMO communication system using 4 transmitting antennas and 4 receiving antennas may be able to theoretically obtain the transfer rate of 4 times of a single antenna system.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Equation 2.

$$s = [s_1, s_2, \ldots, s_{N_T}]^T \quad \text{[Equation 2]}$$

Meanwhile, for each of the transmission information $s_1$, $s_2, \ldots, s_{N_T}$, a transmit power may be differentiated according to the each of the transmission information. In this case, if each of the transmit powers is represented as $P_1$, $P_2, \ldots, P_{N_T}$, transmit power-adjusted transmission information can be represented as a vector in the following Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

And, if $\hat{s}$ is represented using a diagonal matrix P, it can be represented as a following Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, let's consider a case that the NT number of transmission signal $x_1, x_2, \ldots, x_{N_T}$, which is practically transmitted, is configured in a manner of applying a weighted matrix W to the adjusted information vectors $\hat{s}$. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Equation 5. In this case, $W_{ij}$ means a weighting between an ith transmitting antenna and jth information. The W is called the weighted matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$

[Equation 5]

$W\hat{s} = WPs$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Equation 6.

number of streams≤rank(H)≤min($N_T$,$N_R$)   [Equation 6]

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

CA (Carrier Aggregation)

Before description is given of carrier aggregation, the concept of cell introduced to manage radio resources in LTE-A will be described first. A cell may be understood as a combination of downlink resources and uplink resources. Here, the uplink resource is not an essential element of the cell. Accordingly, a cell may include only downlink resources or include downlink resources and uplink resources. The downlink resource may be referred to as a downlink component carrier (DL CC), and the uplink resource may be referred to as an uplink component carrier (UL CC). The DL CC and the UL CC may be represented by carrier frequencies, and a carrier frequency represents a center frequency within the corresponding cell.

Cells may be divided into a primary cell (PCell), which operates at a primary frequency, and a secondary cell (SCell), which operates at a secondary frequency. The PCell and the SCell may be collectively referred to as a serving cell. A cell designated when the UE performs an initial connection establishment procedure or during a connection re-establishment procedure or a handover procedure, may serve as the PCell. In other words, the PCell may be understood as a cell that serves as a control-related center in a carrier aggregation environment, which will be described in detail later. A UE may be assigned a PUCCH in the PCell thereof and may then transmit the assigned PUCCH. The SCell may be configured after establishment of radio resource control (RRC) connection, and SCell may be used for providing additional radio resources. In the carrier aggregation environment, all serving cells except the PCell may be viewed as SCells. In the case in which a UE is in an RRC_CONNECTED state but carrier aggregation is not established or in a case in which the UE does not support carrier aggregation, only a single serving cell consisting of PCells exists. On the other hand, in the case in which a UE is in the RRC_CONNECTED state and carrier aggregation is established therefor, one or more serving cells exist, and PCells and all SCells are included in all serving cells. For a UE supporting carrier aggregation, after an initial security activation procedure is initiated, the network may configure one or more SCells in addition to a PCell configured at the beginning of the connection establishment procedure.

Carrier aggregation is a technology that has been introduced to allow for use of a broader band in order to meet the requirements of a high-speed transmission rate. Carrier aggregation may be defined as an aggregation of two or more component carriers (CCs) having different carrier frequencies or an aggregation of two or more cells. Here the CCs may be consecutive in frequency domain, or may not be consecutive in frequency domain.

The UE may simultaneously receive and monitor downlink data from a plurality of DL CCs. A linkage between a DL CC and a UL CC may be indicated by the system information. The DL CC/UL CC link may be fixed in the system or may be semi-statically configured. Additionally, even if the entire system band consists of N CCs, the frequency band in which a specific UE can perform monitoring/reception may be limited to M(<N) CCs. Various parameters for carrier aggregation may be set up in a cell-specific, UE group-specific, or UE-specific manner.

Cross-carrier scheduling refers to, for example, including all downlink scheduling allocation information about a DL CC in the control region of another DL CC for one of multiple serving cells or including all uplink scheduling grant information about multiple UL CCs linked to a DL CC for one of multiple serving cells in the control region of the DL CC.

Regarding cross-carrier scheduling, a carrier indicator field (CIF) will be described first. The CIF may be included in the DCI format transmitted over the PDCCH (and be defined to have, for example, the size of 3 bits), or may not be included in the DCI format (in this case, the CIF may be defined to have, for example, the size of 0 bit). If the CIF is included in the DCI format, this indicates that cross-carrier scheduling is applied. In the case in which cross-carrier scheduling is not applied, the downlink scheduling allocation information is valid within the DL CC through which downlink scheduling allocation information is currently being transmitted. Additionally, the uplink scheduling grant is valid for a UL CC linked to the DL CC through which the downlink scheduling allocation information is transmitted.

In the case in which cross-carrier scheduling is applied, the CIF indicates a CC related to the downlink scheduling allocation information which is transmitted over the PDCCH in a DL CC. For example, referring to FIG. 11, downlink allocation information about DL CC B and DL CC C, i.e., information about PDSCH resources, is transmitted over the PDCCH within the control region of DL CC A. The UE may monitor DL CC A so as to recognize the resource region of the PDSCH and the corresponding CC through the CIF.

Whether or not the CIF is included in the PDCCH may be semi-statically set, and the CIF may be UE-specifically enabled by higher-layer signaling.

When the CIF is disabled, the PDCCH in a specific DL CC allocates a PDSCH resource in the same DL CC and may also allocate a PUSCH resource in a UL CC linked to the specific DL CC. In this case, the same coding scheme, CCE-based resource mapping, DCI format, and so on, as in the legacy PDCCH structure, may be applied.

When the CIF is enabled, the PDCCH in a specific DL CC may allocate a PDSCH/PUSCH resource within a single DL/UL CC indicated by the CIF, among the multiple aggregated CCs. In this case, a CIF may be additionally defined in the legacy PDCCH DCI format. The CIF may be defined as a field having a fixed length of 3 bits, or the CIF position may be fixed regardless of the size of the DCI format. The coding scheme, CCE-based resource mapping, DCI format, and so on of the legacy PDCCH structure may be applied to this case.

When the CIF exists, an eNB may allocate a DL CC set in which the PDCCH is to be monitored. Accordingly, the burden of blind decoding to the UE may be lessened. The PDCCH monitoring CC set corresponds to a portion of all aggregated DL CCs, and the UE may perform PDCCH detection/decoding only in the corresponding CC set. In other words, in order to perform PDSCH/PUSCH scheduling for a UE, the eNB may transmit the PDCCH only in the PDCCH monitoring CC set. The PDCCH monitoring CC set may be UE-specifically or UE group-specifically or cell-specifically configured. For example, when 3 DL CCs are aggregated as illustrated in FIG. 6, DL CC A may be configured as a PDCCH monitoring DL CC. If the CIF is disabled, the PDCCH in each DL CC may schedule only the PDSCH within the DL CC A. On the other hand, if the CIF is enabled, the PDCCH in DL CC A may schedule not only the PDCCH of the DL CC A but also the PDSCH of the other DL CCs. In the case where the DL CC A is configured as the PDCCH monitoring CC, the PDCCH may not be transmitted in DL CC B and DL CC C.

CoMP (Coordinated Multi Point)

To satisfy enhanced system performance requirements for the 3GPP LTE-A system, CoMP transmission and reception technology (also called co-MIMO, collaborative MIMO or network MIMO) has been proposed. CoMP technology may increase performance of UEs located at a cell edge and average sector throughput.

In a multi-cell environment with a frequency reuse factor set to 1, the performance of a UE located at a cell edge and average sector throughput may be lowered due to inter-cell interference (ICI). To attenuate ICI, the legacy LTE system has adopted a simple passive technique such as fractional frequency reuse (FFR) based on UE-specific power control such that a UE located at a cell edge may have appropriate throughput performance in an environment constrained by interference. However, attenuating the ICI or reusing ICI as a desired signal for the UE may be more desirable than using fewer frequency resources per cell. To this end, a CoMP transmission technique may be employed.

CoMP schemes applicable to downlink may be broadly classified into joint processing (JP) and coordinated scheduling/beamforming (CS/CB).

According to the JP scheme, data can be used by each transmission point (eNB) of a CoMP cooperation unit. The CoMP cooperation unit refers to a set of eNBs used for a CoMP transmission scheme. The JP scheme may be further divided into joint transmission and dynamic cell selection.

Joint transmission refers to a technique of simultaneously transmitting PDSCHs from a plurality of points (a part or the entirety of a CoMP cooperation unit). That is, a plurality of transmission points may simultaneously transmit data to a single UE. With the joint transmission scheme, the quality of a received signal may be coherently or non-coherently improved, and interference with other UEs may be actively eliminated.

Dynamic cell selection is a technique of transmitting a PDSCH from one point (of a CoMP cooperation unit) at a time. That is, one point transmits data to a single UE at a given time point, while the other points in the CoMP cooperation unit do not transmit data to the UE at the time point. A point to transmit data to a UE may be dynamically selected.

Meanwhile, in the CS/CB scheme, CoMP cooperation units may cooperatively perform beamforming for data transmission to a single UE. While data is transmitted to the UE only from a serving cell, user scheduling/beamforming may be determined through coordination among cells of the CoMP cooperation units.

In the case of uplink, CoMP reception refers to reception of a signal transmitted through cooperation among a plurality of geographically separated points. CoMP schemes applicable to uplink may be classified into joint reception (JR) and coordinated scheduling/beamforming (CS/CB).

The JR scheme indicates that a plurality of reception points receives a signal transmitted through a PUSCH. The CS/CB scheme indicates that only one point receives a PUSCH, and user scheduling/beamforming is determined by coordination among the cells of the CoMP unit.

With a CoMP system as above, multi-cell base stations may jointly support data for a UE. In addition, the base stations may simultaneously support one or more UEs using the same radio frequency resources, thereby increasing system performance. Moreover, a base station may perform space division multiple access (SDMA) based on CSI between the UE and the base station.

In the CoMP system, a serving eNB and one or more cooperative eNBs are connected to a scheduler over a backbone network. The scheduler may receive channel information about the channel states between each UE and cooperative eNBs measured and fed back by the cooperative eNBs over the backbone network, and operate based on the channel information. For example, the scheduler may schedule information for a cooperative MIMO operation for the serving eNB and the one or more cooperative eNBs. That is, the scheduler may directly give each eNB a command to perform the cooperative MIMO operation.

As noted from the above description, it can be said that the CoMP system operates as a virtual MIMO system by grouping a plurality of cells into one group. Basically, the CoMP system may adopt a MIMO communication scheme employing multiple antennas.

Transmission Modes in LTE

In the following description, an example for a transmission mode of a downlink data channel is described. Currently, 3GPP LTE standard document, specifically, 3GPP TS 36.213 document defines a transmission mode of a downlink data channel as shown in Table 1 in the following. The transmission mode is set to a user equipment via an upper layer signaling, i.e., RRC signaling.

TABLE 1

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |
| Mode 2 | DCI format 1A | Transmit diversity |
| | DCI format 1 | Transmit diversity |
| Mode 3 | DCI format 1A | Transmit diversity |
| | DCI format 2A | Large delay CDD or Transmit diversity |
| Mode 4 | DCI format 1A | Transmit diversity |
| | DCI format 2 | Closed-loop spatial multiplexing or Transmit diversity |
| Mode 5 | DCI format 1A | Transmit diversity |
| | DCI format 1D | Multi-user MIMO |
| Mode 6 | DCI format 1A | Transmit diversity |
| | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
| | DCI format 1 | Single-antenna port, port 5 |
| Mode 8 | DCI format 1A | If the number of PBCH antenna ports is one, Single-antenna port, port 0 is used, otherwise Transmit diversity |
| | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity<br>MBSFN subframe: Single-antenna port, port 7 |
| | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity<br>MBSFN subframe: Single-antenna port, port 7 |
| | DCI format 2D | Up to 8 layer transmission, ports 7-14 or single-antenna port, port 7 or 8 |

Referring to Table 1, current 3GPP LTE standard document includes a downlink control information (DCI) format, which is defined according to a type of RNTI masked on PDCCH. In particular, in case of a C-RNTI and an SPS C-RNTI, a transmission mode and a DCI format corresponding to the transmission mode (i.e., a transmission mode-based DCI format) are included in the document. And, a DCI format 1A for a Fall-back mode, which is capable of being applied irrespective of each transmission mode, is defined in the document. Table 1 shows an example of a case that a type of RNTI masked on PDCCH corresponds to a C-RNTI.

In Table 1, a transmission mode 10 indicates a downlink data channel transmission mode of the aforementioned CoMP transmission method. For instance, referring to Table 1, if a user equipment performs a blind decoding on PDCCH masked with C-RNTI and then detects a DCI format 2D, the user equipment decodes PDSCH in an assumption that the PDSCH has been transmitted with a multi-layer transmission scheme based on antenna port 7 to 14, i.e., DM-RS. Or, the user equipment decodes PDSCH in an assumption that the PDSCH has been transmitted with a single antenna transmission scheme based on DM-RS antenna port 7 or 8.

On the contrary, if the user equipment performs blind decoding on PDCCH masked with C-RNTI and then detects a DCI format 1A, a transmission mode varies according to whether a corresponding subframe corresponds to an MBSFN subframe. For instance, if the corresponding subframe corresponds to a non-MBSFN subframe, the user equipment decodes PDSCH in an assumption that the PDSCH has been transmitted with a single antenna transmission scheme based on a CRS of an antenna port 0 or a CRS-based transmit diversity scheme. And, if the corresponding subframe corresponds to an MBSFN subframe, the user equipment decodes the PDSCH in an assumption that the PDSCH has been transmitted with a single antenna transmission based on a DM-RS of an antenna port 7.

Transmit Power Control (TPC)

A transmit power control (TPC) command from a base station can be defined in a DCI format of a PDCCH. Single transmit antenna transmission is exemplified in the following description.

The base station can adjust uplink power according to a closed loop correction factor $\Delta$. When a physical uplink shared channel (PUSCH) is transmitted alone without a PUCCH, the PUSCH can be transmitted with transmit power represented by Equation 7.

$$P_{PUSCH}(i)=\min\{P_{CMAX}, 10\log_{10}(M_{PUSCH}(i)) + P_{O\_PUSCH}(j)+\alpha(j)\cdot PL+\Delta_{TF}(i)+f(i)\}$$ [Equation 7]

$P_{PUSCH}(i)$ indicates transmit power of an i-th subframe for the PUSCH, $P_{CMAX}$ indicates normal transfer capability, $M_{PUSCH}(i)$ represents the quantity of allocated resources and $P_{O\_PUSCH}(i)$ represents an RRC signaled value. In addition, $\alpha(j)\cdot PL$ is a term for pathloss compensation, $\Delta TF(i)$ is a value set by a flag "deltaMCS-Enabled", and f(i) indicates closed loop correction.

Power control for a PUCCH can be defined as in Equation 8. Description of contents that can be inferred from description of Equation 7 may be omitted.

$$P_{PUCCH}(i)=\min\{P_{CMAX}, P_{O\_PUCCH}+PL+h(n_{CQI}, n_{HARQ})+\Delta_{F\_PUCCH}(F)+g(i)\}$$ [Equation 8]

In Equation 8, $\Delta_{F\_PUCCH}(F)$ is provided by a higher layer and corresponds to a PUCCH format. $h(n_{CQI}, n_{HARQ})$ is a value dependent on the PUCCH format, wherein $n_{CQI}$ corresponds to a number information bit for channel quality information (CQI) and $n_{HARQ}$ corresponds to the number of HARQ (Hybrid Automatic Repeat request) bits. $P_{O\_PUCCH}(j)$ is a parameter composed of the sum of $P_{O\_NOMINAL\_PUCCH}(j)$ and $P_{O\_NOMINAL\_SPECIFIC}(j)$, and g(i) indicates closed loop correction.

$$P_{SRS}(i)=\min\{P_{CMAX}, P_{SRS\_OFFSET}+10\log_{10}(M_{SRS})+ P_{O\_PUSCH}(j)+\alpha(j)\cdot PL+f(i)\}$$ [Equation 8]

In Equation 9, $P_{SRS\_OFFSET}$ is a 4-bit UE-specific parameter semi-statically set by a higher layer.

Reference Signals

Here after, a reference signal is explained.

In transmitting packets in a wireless communication system, the packets are transmitted over a radio channel, and therefore signal distortion may occur in the transmission process. For a receive entity to receive the correct signal in spite of signal distortion, the received distorted signal should be corrected using channel information. In detecting the channel information, a signal which is known to both the transmit entity and the receive entity is usually transmitted and the degree of distortion of the signal received over the channel is used to detect the channel information. This signal is referred to as a pilot signal or a reference signal.

When data is transmitted and received using multiple antennas, channel state between each Tx antenna and each Rx antenna needs to be recognized in order to receive a correct signal. Accordingly, a separate reference signal needs to be present per Tx antenna.

The RSs may be broadly divided into two types according to the purposes thereof. One type is used to acquire channel information and the other type is used for data demodulation. Since the former RS is used to allow the UE to acquire DL channel information, this RS should be transmitted over a wide band, and even a UE which does not receive DL data in a specific subframe should be receive and measure the RS. Such RS is also used for measurement of, for example, handover. The latter RS is sent when an eNB sends a resource on downlink. The UE may perform channel measurement by receiving this RS, thereby implementing data modulation. This RS should be transmitted in a region in which data is transmitted.

Cell/UE-Specific RS

Legacy 3GPP LTE systems (e.g., 3GPP LTE Release-8) define two types of downlink RSs for the unicast service. One is a common RS (CRS), and the other is a dedicated RS (DRS). The CRS is used for acquisition of information about the channel state and measurement of, for example, handover, and may be referred to as a cell-specific RS. The DRS is used for data demodulation, and may be referred to as a UE-specific RS. In the legacy 3GPP LTE systems, the DRS may be used only for data demodulation, and the CRS may be used for both acquisition of channel information and data demodulation.

The CRS is transmitted cell-specifically in every subframe in a wideband. The CRS may be transmitted with respect to up to four antenna ports depending on the number of Tx antennas of the eNB. For example, if the number of Tx antennas of the eNB is 2, CRSs for antenna ports #0 and #1 are transmitted. If the number of Tx antennas of the eNB is 4, CRSs for antenna ports #0 to #3 are respectively transmitted.

Figure 8:
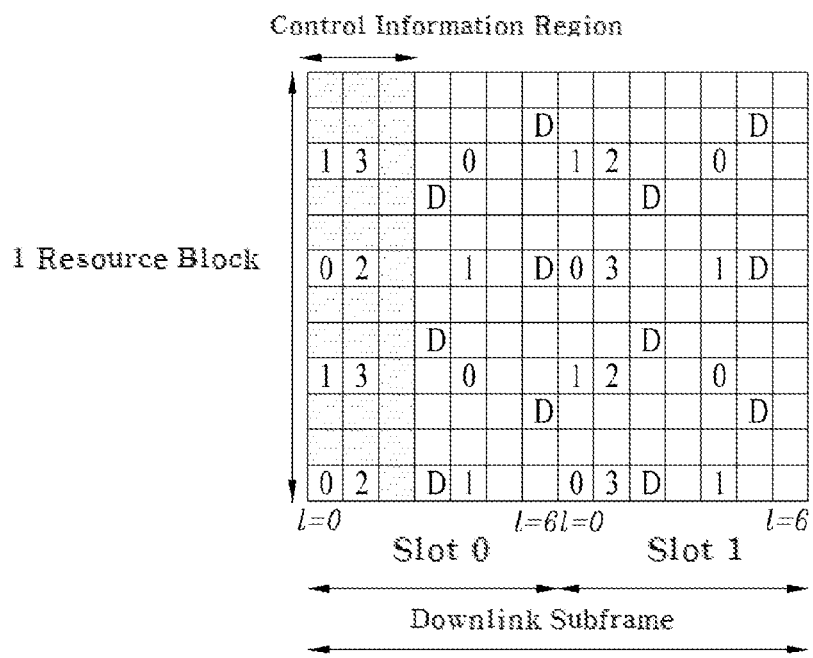
FIGS. 8 and 9 illustrate downlink reference signal structures in LTE supporting downlink transmission using 4 antennas.
Figure 9:
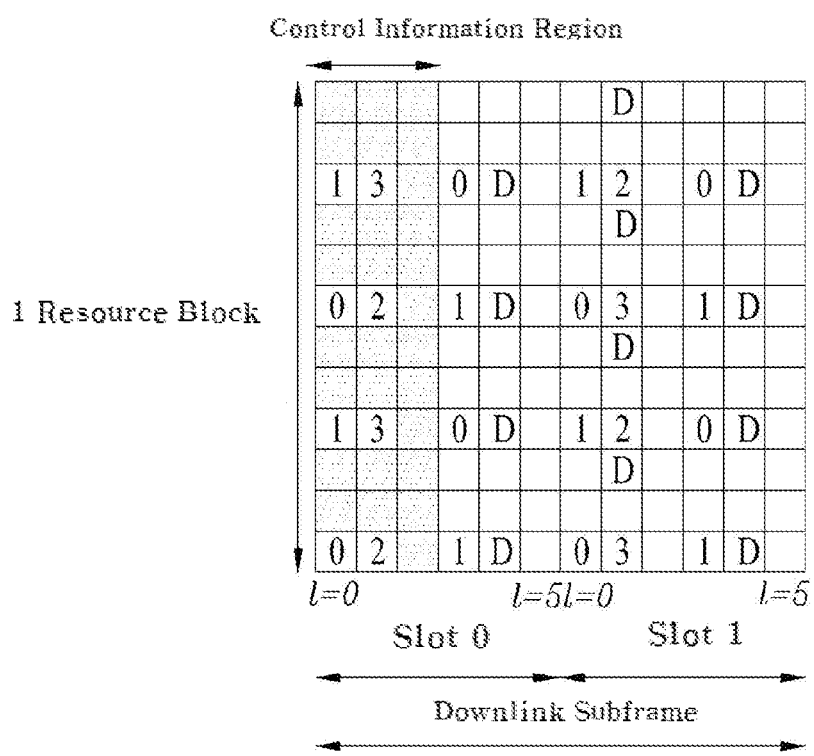

FIG. 8 and FIG. 9 are diagrams of a structure of a reference signal in LTE system supportive of downlink transmission using 4 antennas. In particular, FIG. 8 shows a case of a normal cyclic prefix and FIG. 9 shows a case of an extended cyclic prefix.

Referring to FIG. 8 and FIG. 9, 0 to 3 written on a grid may mean the CRS (common reference signal), which is a cell-specific reference signal, transmitted for the channel measurement and the data demodulation in a manner of corresponding to antenna port 0 to 3, respectively. The cell-specific reference signal CRS can be transmitted to a user equipment via the control information region as well as the data information region.

And, 'D' written on the grid may mean a downlink DM-RS (demodulation RS), which is a user-specific RS. The DM-RS supports a single antenna port transmission via the data region, i.e., the PDSCH. The user equipment is signaled whether the DM-RS, which is the user equipment-specific RS, exists or not via an upper layer. FIG. 8 and FIG. 9 show an example of the DM-RS corresponding to an antenna port 5. The DM-RSs corresponding to an antenna port 7 to 14, i.e., total 8 antenna ports, are also defined by 3GPP standard document 36.211.

LTE-A, which is an advanced version of LTE, can supports up to 8 Tx antennas on downlink. Accordingly, RSs for up to 8 Tx antennas need to be supported in LTE-A. In LTE, downlink RSs are defined only for up to 4 antenna ports. Therefore, if an eNB has 4 to 8 DL Tx antennas in LTE-A, RSs for these antenna ports need to be additionally defined. As the RSs for up to 8 Tx antenna ports, both the RS for channel measurement and the RS for data demodulation need to be considered.

One important consideration in designing an LTE-A system is backward compatibility. Backward compatibility refers to supporting the legacy LTE UE such that the legacy LTE UE normally operates in the LTE-A system. In terms of RS transmission, if RSs for up to 8 Tx antennas are added to a time-frequency region in which a CRS defined in the LTE standard is transmitted in every subframe over the full band, RS overhead excessively increases. Accordingly, in designing new RSs for up to 8 antenna ports, reducing RS overhead needs to be considered.

DMRS/CSI-RS

The new RSs introduced in LTE-A may be classified into two types. One is a channel state information-RS (CSI-RS) intended for channel measurement for selecting a transmission rank, a modulation and coding scheme (MCS), a precoding matrix index (PMI), and the like, and the other is a demodulation RS (DMRS) intended for demodulation of data transmitted through up to 8 Tx antennas.

The CSI-RS intended for channel measurement is designed only for channel measurement, unlike the existing CRS, which is used for data demodulation as well as for channel measurement and handover measurement. Of course, the CSI-RS may also be used for handover measurement. Since the CSI-RS is transmitted only in order to obtain information about channel states, the CSI-RS need not be transmitted in every subframe, unlike the CRS for the legacy LTE system. Accordingly, to reduce overhead of the CSI-RS, the CSI-RS may be designed to be intermittently (e.g., periodically) transmitted in the time domain.

When data is transmitted in a certain DL subframe, a dedicated DMRS is transmitted to a UE for which the data transmission is scheduled. That is, the DMRS may be referred to as a UE-specific RS. A DMRS dedicated to a specific UE may be designed to be transmitted only in a resource region in which the UE is scheduled, i.e., the time-frequency region in which data for the UE is transmitted.

Figure 10:
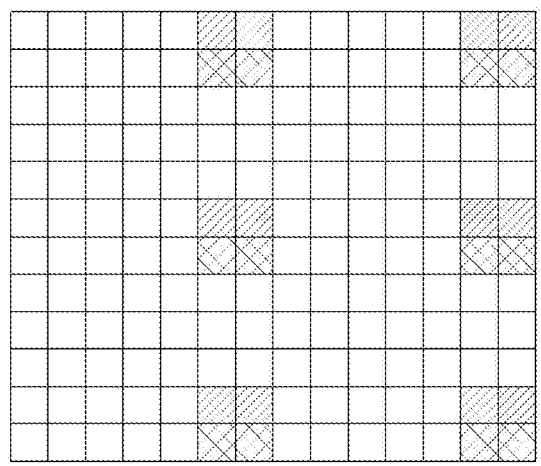
FIG. 10 illustrates an example of allocating a downlink DMRS defined in the 3GPP standard document.

FIG. 10 illustrates an exemplary DMRS pattern defined in LTE-A.

FIG. 10 shows positions of REs for transmission of DMRSs on one RB pair (14 OFDM symbols in the time domain×12 subcarriers in the frequency domain in the case of normal CP) on which downlink data is transmitted. The DMRS may be transmitted with respect to four antenna ports (antenna port indexes 7, 8, 9 and 10) which are additionally defined in LTE-A. DMRSs for different antenna ports may be distinguished from each other as they are positioned on different frequency resources (subcarriers) and/or different time resources (OFDM symbols) (namely, they may be multiplexed using FDM and/or TDM). DMRSs for different antenna ports positioned on the same time-frequency resource may be distinguished from each other by an orthogonal code (namely, they may be multiplexed using the CDM scheme).

Referring to FIG. 10, DMRS corresponding to antenna port {7, 8, 11, 13} is mapped to DMRS group 1 using sequence per antenna port, DMRS corresponding to antenna port {9, 10, 12, 14} is mapped to DMRS group 4 using sequence per antenna port.

Figure 11:
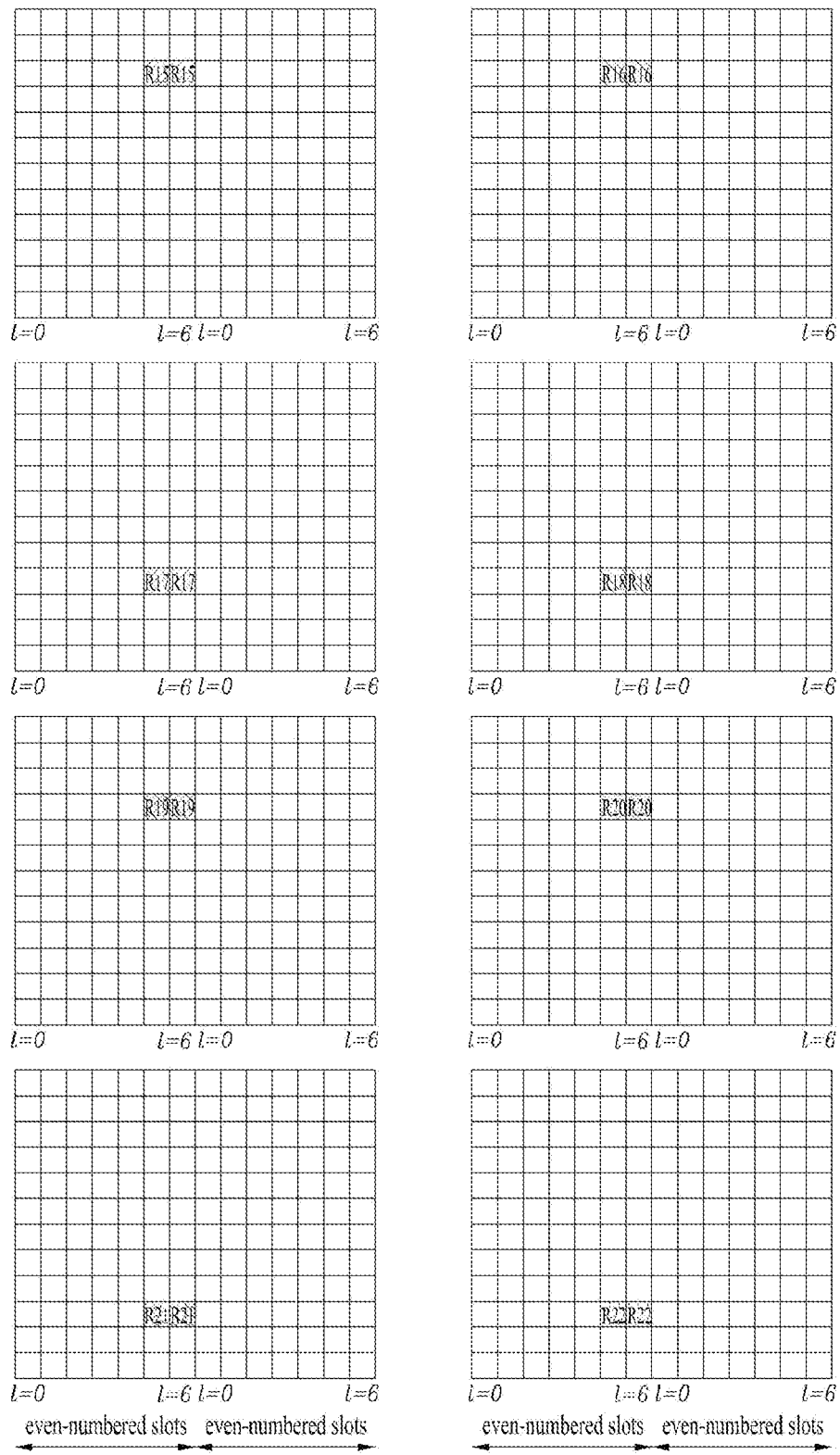
FIG. 11 illustrates CSI-RS configuration #0 in a normal CP case from among downlink CSI-RS configurations defined in the 3GPP standard document.

FIG. 11 illustrates exemplary CSI-RS patterns defined in LTE-A.

FIG. 11 shows positions of resource elements through which CSI-RSs are transmitted in one resource block pair (14 OFDM symbols in the time domain×12 subcarriers in the frequency domain in a normal CP case) through which downlink data is transmitted. CSI-RSs can be transmitted for 8 antenna ports (corresponding to antenna port indices 15, 16, 17, 18, 19, 20, 21 and 22) additionally defined in LTE-A. CSI-RS for different antenna ports can be discriminated by being positioned in different frequency resources (subcarriers) and/or different time resources (OFDM symbols) (that is, multiplexed according to FDM and/or TDM). CSI-RSs, positioned in the same time-frequency resource, for different antenna ports may be discriminated by orthogonal codes (that is, multiplexed according to CDM). The CSI-RS has been proposed for channel measurement with respect to a PDSCH, separately from the CRS, and can be defined in different resource configurations in order to reduce inter-cell interference (ICI) in a multi-cell environment, distinguished from the CRS.

The aforementioned CRS/DRS/DMRS/CSI-RS patterns are exemplary and embodiments of the present invention are not limited to specific RS patterns. When other RS patterns are defined and used, various embodiments of the present invention can be equally applied thereto.

—CSI-RS Configuration

CSI-RS (resource) configuration varies according to the number of antenna ports. A CSI-RS is configured to be transmitted by different (resource) configurations between neighboring cells. Unlike the CRS, the CSI-RS supports maximum 8 antenna ports. According to 3GPP standard document, total 8 antenna ports (antenna port 15 to antenna port 22) are assigned as the antenna port for the CSI-RS. [Table 2] and [Table 3] list CSI-RS configurations defined in the 3GPP standard. Specifically, [Table 2] lists CSI-RS configurations in the case of a normal CP and [Table 3] lists CSI-RS configurations in the case of an extended CP.

TABLE 2

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
|  | 1 | (11, 2) | 1 | (11, 2) | 1 | (11, 2) | 1 |
|  | 2 | (9, 2) | 1 | (9, 2) | 1 | (9, 2) | 1 |
|  | 3 | (7, 2) | 1 | (7, 2) | 1 | (7, 2) | 1 |
|  | 4 | (9, 5) | 1 | (9, 5) | 1 | (9, 5) | 1 |
|  | 5 | (8, 5) | 0 | (8, 5) | 0 |  |  |
|  | 6 | (10, 2) | 1 | (10, 2) | 1 |  |  |
|  | 7 | (8, 2) | 1 | (8, 2) | 1 |  |  |
|  | 8 | (6, 2) | 1 | (6, 2) | 1 |  |  |
|  | 9 | (8, 5) | 1 | (8, 5) | 1 |  |  |
|  | 10 | (3, 5) | 0 |  |  |  |  |
|  | 11 | (2, 5) | 0 |  |  |  |  |
|  | 12 | (5, 2) | 1 |  |  |  |  |
|  | 13 | (4, 2) | 1 |  |  |  |  |
|  | 14 | (3, 2) | 1 |  |  |  |  |
|  | 15 | (2, 2) | 1 |  |  |  |  |
|  | 16 | (1, 2) | 1 |  |  |  |  |
|  | 17 | (0, 2) | 1 |  |  |  |  |
|  | 18 | (3, 5) | 1 |  |  |  |  |
|  | 19 | (2, 5) | 1 |  |  |  |  |
| Frame structure type 2 only | 20 | (11, 1) | 1 | (11, 1) | 1 | (11, 1) | 1 |
|  | 21 | (9, 1) | 1 | (9, 1) | 1 | (9, 1) | 1 |
|  | 22 | (7, 1) | 1 | (7, 1) | 1 | (7, 1) | 1 |
|  | 23 | (10, 1) | 1 | (10, 1) | 1 |  |  |
|  | 24 | (8, 1) | 1 | (8, 1) | 1 |  |  |
|  | 25 | (6, 1) | 1 | (6, 1) | 1 |  |  |
|  | 26 | (5, 1) | 1 |  |  |  |  |
|  | 27 | (4, 1) | 1 |  |  |  |  |
|  | 28 | (3, 1) | 1 |  |  |  |  |
|  | 29 | (2, 1) | 1 |  |  |  |  |
|  | 30 | (1, 1) | 1 |  |  |  |  |
|  | 31 | (0, 1) | 1 |  |  |  |  |

TABLE 3

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
|  | 1 | (9, 4) | 0 | (9, 4) | 0 | (9, 4) | 0 |
|  | 2 | (10, 4) | 1 | (10, 4) | 1 | (10, 4) | 1 |
|  | 3 | (9, 4) | 1 | (9, 4) | 1 | (9, 4) | 1 |
|  | 4 | (5, 4) | 0 | (5, 4) | 0 |  |  |
|  | 5 | (3, 4) | 0 | (3, 4) | 0 |  |  |
|  | 6 | (4, 4) | 1 | (4, 4) | 1 |  |  |
|  | 7 | (3, 4) | 1 | (3, 4) | 1 |  |  |
|  | 8 | (8, 4) | 0 |  |  |  |  |
|  | 9 | (6, 4) | 0 |  |  |  |  |
|  | 10 | (2, 4) | 0 |  |  |  |  |
|  | 11 | (0, 4) | 0 |  |  |  |  |
|  | 12 | (7, 4) | 1 |  |  |  |  |

TABLE 3-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 2 only | 13 | (6, 4) | 1 | | | | |
| | 14 | (1, 4) | 1 | | | | |
| | 15 | (0, 4) | 1 | | | | |
| | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

In [Table 2] and [Table 3], (k',l') represents an RE index where k' is a subcarrier index and is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI-RS}$ and a subframe offset $\Delta_{CSI-RS}$. [Table 4] lists CSI-RS subframe configurations defined in the 3GPP standard.

TABLE 4

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Meanwhile, information about a Zero Power (ZP) CSI-RS is transmitted in a CSI-RS-Config-r10 message configured by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by $I_{CSI-RS}$ illustrated in [Table 4]. zeroTxPowerResourceConfigList-r10 indicates a ZP CSI-RS configuration. The elements of this bitmap indicate the respective configurations written in the columns for four CSI-RS antenna ports in [Table 2] or [Table 3]. A general CSI-RS that is not the ZP CSI-RS is referred to as a non zero-power (NZP) CSI-RS.

Contrary to the CRS transmitted in all subframes in which a PDSCH can be transmitted, the CSI-RS may be configured to be transmitted only in some subframes. For example, CSI subframe sets $C_{CSI,0}$ and $C_{CSI,1}$ may be configured by a higher layer. CSI reference resource (i.e., a predetermined resource region forming the basis of CSI calculation) may belong to either $C_{CSI,0}$ or $C_{CSI,1}$, may not belong to both $C_{CSI,0}$ and $C_{CSI,1}$ at the same time. Accordingly, when CSI subframe sets $C_{CSI,0}$ and $C_{CSI,1}$ are configured by a higher layer, the UE is not allowed to expect that it will receive a trigger (or an indication for CSI calculation) for a CSI reference resource which is present in a subframe which belongs to none of the CSI subframe sets.

Alternatively, the CSI reference resource may be configured in a valid downlink subframe. The valid downlink subframe may be configured as a subframe satisfying various conditions. In the case of periodic CSI reporting, one of the conditions may be a subframe belonging to a CSI subframe set that is linked to periodic CSI reporting when a CSI subframe set is configured for the UE.

The UE may derive a CQI index from the CSI reference resource in consideration of the following assumptions (For details, see 3GPP TS 36.213).

First three OFDM symbols in a subframe are occupied by control signaling.

No REs are used by a primary synchronization signal, a secondary synchronization signal, or a physical broadcast channel (PBCH).

CP length of a non-Multicast Broadcast Single Frequency Network (MBSFN) subframe.

Redundancy version is 0.

If a CSI-RS is used for channel measurement, the ratio of PDSCH energy per resource element (EPRE) to CSI-RS EPRE conforms to a predetermined rule.

For CSI reporting in transmission mode 9 (i.e., the mode supporting up to 8-layer transmission), if the UE is configured for PMI/RI reporting, it is assumed that DMRS overhead corresponds to the most recently reported rank. For example, in the case of two or more antenna ports (i.e., rank less than or equal to 2) as described in FIG. 7, DMRS overhead on one RB pair is 12 REs, whereas DMRS overhead in the case of three or more antenna ports (i.e., rank greater than or equal to 3) is 24 REs. Therefore, a CQI index may be calculated on the assumption of DMRS overhead corresponding to the most recently reported rank value.

No REs are allocated to a CSI-RS and a zero-power CSI-RS.

No REs are allocated to a positioning RS (PRS).

The PDSCH transmission scheme conforms to a transmission mode currently set for the UE (the mode may be a default mode).

The ratio of PDSCH EPRE to cell-specific RS EPRE conforms to a predetermined rule.

The eNB may inform UEs of such a CSI-RS configuration through, for example, radio resource control (RRC) signaling. That is, information about the CSI-RS configuration may be provided to UEs in a cell using dedicated RRC signaling. For example, while a UE establishes a connection with the eNB through initial access or handover, the eNB may inform the UE of the CSI-RS configuration through RRC signaling. Alternatively, when the eNB transmits, to a UE, an RRC signaling message demanding channel state feedback based on CSI-RS measurement, the eNB may inform the UE of the CSI-RS configuration through the RRC signaling message.

When the aforementioned CoMP scheme is applied, a UE may be configured with a plurality of CSI-RS settings through an RRC layer signal. Each CSI-RS configuration is defined according to Table 5 below. As seen from Table 5, each CSI-RS setting contains information about CRS that can be quasi co-location (QCL) assumed.

(pdsch-Start), NZP (Non-ZP) CSI-RS QCL (Quasi Co-Location) information, and (qcl-CSI-RS-ConfigNZPId) information.

QCL (Quasi Co-Location)

In the following, QCL (Quasi Co-Location) between antenna ports is explained.

QCL between antenna ports indicates that all or a part of large-scale properties of a signal (or a radio channel corresponding to a corresponding antenna port) received by a user equipment from a single antenna port may be identical to large-scale properties of a signal (or a radio channel corresponding to a corresponding antenna port) received from a

TABLE 5

CSI-RS-ConfigNZP information elements

```
-- ASN1START
CSI-RS-ConfigNZP-r11 ::=        SEQUENCE {
    csi-RS-ConfigNZPId-r11          CSI-RS-ConfigNZPId-r11,
    antennaPortsCount-r11           ENUMERATED {an1, an2, an4, an8},
    resourceConfig-r11              INTEGER (0..31),
    subframeConfig-r11              INTEGER (0..154),
    scramblingIdentity-r11          INTEGER (0..503),
    qcl-CRS-Info-r11                SEQUENCE {
        qcl-ScramblingIdentity-r11      INTEGER (0..503),
        crs-PortsCount-r11              ENUMERATED (n1, n2, n4, spare1),
        mbsfn-SubframeConfigList-r11    CHOICE {
            release                         NULL,
            setup                           SEQUENCE {
                subframeConfigList              MBSFN-SubframeConfigList
            }
        }                                                           OPTIONAL    -- Need ON
    }                                                               OPTIONAL,   -- Need OR
    ...
}
-- ASN1STOP
```

PQI (PDSCH RE Mapping and Quasi-Co-Location Indicator)

Recently, the 3GPP LTE-A standard has defined a PDSCH RE Mapping and Quasi-Co-Location Indicator (PQI) in DCI format 2D for transmission mode 10 that is a CoMP method of PDSCH transmission. In detail, the PQI field is defined with a 2-bit size and indicates 4 of total states according to Table 6 below, information indicated by each state is a parameter set for reception of The method of PDSCH, and detailed values of the information is pre-signaled via a higher layer. That is, for Table 6 below, four of total parameter sets may be semi-statically signaled via an RRC layer signal and a DCI format 2D of a PQI field dynamically indicates one of the four of total parameter sets.

TABLE 6

| Value of 'PDSCH RE Mapping and Quasi-Co-Location Indicator' field | Description |
|---|---|
| '00' | Parameter set 1 configured by higher layers |
| '01' | Parameter set 2 configured by higher layers |
| '10' | Parameter set 3 configured by higher layers |
| '11' | Parameter set 4 configured by higher layers |

Information included in the parameter set includes one of the number of CRS antenna ports (crs-PortsCount), a CRS frequency shift value (crs-FreqShift), MBSFN subframe configuration (mbsfn-SubframeConfigList), ZP CSI-RS configuration (csi-RS-ConfigZPId), PDSCH start symbol different single antenna port. In this case, the larger-scale properties may include Doppler spread related to frequency offset, Doppler shift, average delay related to timing offset, delay spread and the like. Moreover, the larger-scale properties may include average gain as well.

According to the aforementioned definition, a user equipment cannot assume that the large-scale properties are identical to each other between antenna ports not in the QCL, i.e., NQCL (Non Quasi co-located) antenna ports. In this case, the user equipment should independently perform a tracking procedure to obtain frequency offset, timing offset and the like according to an antenna port.

In LTE, when a downlink signal is transmitted in transmission mode 10 which is a CoMP mode, a base station sets one of QCL type A and QCL type B for UEs through a higher layer signal. QCL type A can be considered to be a scheme in which a UE operates on the assumption that antenna ports corresponding to antenna port indices 0 to 3 (i.e. CRS antenna ports), 7 to 14 (i.e. UE-specific RS antenna ports) and 15 to 22 (i.e. CSI-RS antenna ports) of a serving cell are quasi-co-located for delay spread, Doppler spread, Doppler shift and average delay.

QCL type B can be considered to be a scheme in which a UE operates on the assumption that antenna ports corresponding to antenna port indices 15 to 22 (i.e. CSI-Rs antenna ports) corresponding to a CSI-RS resource configuration identified by non-zero power (NZP) CSI-RS configuration information (qcl-CSI-RS-ConfigNZPId-r11) provided by a higher layer and antenna ports corresponding to antenna port indices 7 to 14 (i.e. UE-specific RS antenna ports) related to a PDSCH are quasi-co-located for Doppler shift, Doppler spread, average delay and delay spread.

A UE set to QCL type B can determine PDSCH RE mapping using a parameter set indicated by a PQI field of DCI format 2D of a detected PDCCH/EPDCCH and determine PDSCH AP QCL.

Channel State Information (CSI)

MIMO schemes may be classified into open-loop MIMO and closed-loop MIMO. In open-loop MIMO, a MIMO transmitter performs MIMO transmission without receiving CSI feedback from a MIMO receiver. In closed-loop MIMO, the MIMO transmitter receives CSI feedback from the MIMO receiver and then performs MIMO transmission. In closed-loop MIMO, each of the transmitter and the receiver may perform beamforming based on the CSI to achieve a multiplexing gain of MIMO Tx antennas. To allow the receiver (e.g., a UE) to feed back CSI, the transmitter (e.g., an eNB) may allocate a UL control channel or a UL-SCH to the receiver.

The UE may perform estimation and/or measurement of a downlink channel using a CRS and/or a CSI-RS. The CSI fed back to the eNB by the UE may include a rank indicator (RI), a precoding matrix indicator (PMI), and a channel quality indicator (CQI).

The RI is information about a channel rank. The channel rank represents the maximum number of layers (or streams) that can carry different pieces of information in the same time-frequency resources. Since the rank is determined mainly according to long-term fading of a channel, the RI may be fed back with a longer periodicity (namely, less frequently) than the PMI and the CQI.

The PMI is information about a precoding matrix used for transmission from a transmitter and has a value reflecting the spatial characteristics of a channel. Precoding refers to mapping transmission layers to Tx antennas. A layer-antenna mapping relationship may be determined by the precoding matrix. The PMI corresponds to an index of a precoding matrix of an eNB preferred by the UE based on a metric such as signal-to-interference-plus-noise ratio (SINR). In order to reduce the feedback overhead of precoding information, the transmitter and the receiver may pre-share a codebook including multiple precoding matrices, and only the index indicating a specific precoding matrix in the codebook may be fed back. For example, the PMI may be determined based on the most recently reported RI.

The CQI is information indicating channel quality or channel strength. The CQI may be expressed as a predetermined MCS combination. That is, a CQI index that is fed back indicates a corresponding modulation scheme and code rate. The CQI may configure a specific resource region (e.g., a region specified by a valid subframe and/or a physical RB) as a CQI reference resource and be calculated on the assumption that PDSCH transmission is present on the CQI reference resource, and the PDSCH can be received without exceeding a predetermined error probability (e.g., 0.1). Generally, the CQI has a value reflecting a received SINR which can be obtained when the eNB configures a spatial channel using a PMI. For instance, the CQI may be calculated based on the most recently reported RI and/or PMI.

In a system supporting an extended antenna configuration (e.g., an LTE-A system), additional acquisition of multi user (MU)-MIMO diversity using an MU-MIMO scheme is considered. In the MU-MIMO scheme, when an eNB performs downlink transmission using CSI fed back by one UE among multiple users, it is necessary to prevent interference with other UEs because there is an interference channel between UEs multiplexed in the antenna domain. Accordingly, CSI of higher accuracy than in a single-user (SU)-MIMO scheme should be fed back in order to correctly perform MU-MIMO operation.

A new CSI feedback scheme may be adopted by modifying the existing CSI including an RI, a PMI, and a CQI so as to measure and report more accurate CSI. For example, precoding information fed back by the receiver may be indicated by a combination of two PMIs (e.g., i1 and i2). Thereby, more precise PMI may be fed back, and more precise CQI may be calculated and reported based on such precise PMI.

Meanwhile, the CSI may be periodically transmitted over a PUCCH and or aperiodically transmitted over a PUSCH. For the RI, various reporting modes may be defined depending on which of a first PMI (e.g., W1), a second PMI (e.g., W2), and a CQI is fed back and whether the PMI and/or CQI that is fed back relates to a wideband (WB) or a subband (SB).

CQI Computation

Hereinafter, CQI calculation will be described in detail on the assumption that the downlink receiver is a UE. However, the description of the present invention given below may also be applied to a relay station serving to perform downlink reception.

A description will be given below of a method for configuring/defining a resource (hereinafter, referred to as a reference resource) forming the basis of calculation of the CQI when the UE reports CSI. The CQI is more specifically defined below.

A CQI that the UE reports corresponds to a specific index value. The CQI index has a value indicating a modulation technique, code rate, and the like that correspond to the channel state. For example, CQI indexes and analyzed meanings thereof may be given as shown in Table 7 below.

TABLE 7

| CQI index | Modulation | Code rate × 1024 | Efficiency |
| --- | --- | --- | --- |
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 1 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Based on an observation which is not restricted by time and frequency, the UE may determine the highest CQI index satisfying a predetermined requirement among CQI indexes 1 to 15 of Table 3 with respect to each CQI value reported in uplink subframe n. The predetermined requirement may be that a single PDSCH transmission block which has a combination of a modulation scheme (e.g., MCS) and a transmission block size (TBS) corresponding to the CQI index and occupies a group of downlink physical RBs called a CQI reference resource should be received with a transmission block error probability not exceeding 0.1 (i.e., 10%). If even CQI index 1 does not satisfy the aforementioned requirement, the UE may determine CQI index 0.

In transmission mode 9 (corresponding to transmission of up to 8 layers) and the feedback reporting mode, the UE may perform channel measurement for calculation of the CQI value reported in uplink subframe n based only on the CSI-RS. In the other transmission modes and corresponding reporting modes, the UE may perform channel measurement for CQI calculation based on the CRS.

If all requirements given below are satisfied, a combination of a modulation scheme and a TBS may correspond to one CQI index. That is, the combination should be allowed to be signaled on a PDSCH in a CQI reference resource according to an associated TRS table, the modulation scheme should be indicated by a corresponding CQI index, and when the combination of a TBS and a modulation scheme is applied to the reference resource, a valid channel code rate as close to the code rate indicated by the CQI index as possible should be given. If two or more combinations of a TBS and a modulation scheme are almost equal to the code rate indicated by the corresponding CQI index, a combination having the smallest TBS may be determined.

A CQI reference resource is defined as the following.

In the frequency domain, the CQI reference resource defined as a group of downlink physical RBs corresponds to a band associated with the derived CQI value.

In the time domain, the CQI reference resource is defined as a single downlink subframe n-nCQI_ref. In the case of periodic CQI reporting, nCQI_ref is determined to have a value that is smallest among the values greater than or equal to 4 and corresponds to a downlink subframe in which downlink subframe n-nCQI_ref is valid. In the case of aperiodic CQI reporting, a downlink subframe identical to a valid downlink subframe corresponding to a CQI request in an uplink DCI format (namely, the PDCCH DCI format for providing the UE with uplink scheduling control information) (or having a received CQI request) is determined as a CQI reference resource for nCQI_ref. In aperiodic CQI reporting, nCQI_ref may be 4, and downlink subframe n-nCQI_ref may correspond to a valid downlink subframe. Herein, downlink subframe n-nCQI_ref may be received after a subframe corresponding to a CQI request in a random access response grant (or having a received CQI request). The valid downlink subframe refers to a downlink subframe that is configured for the UE, is not set as a MBSFN subframe except in transmission mode 9, and neither includes a DwPTS field if the length of DwPTS is less than or equal to 7680*Ts (Ts=1/(15000×2048) seconds), nor belongs to a measurement gap configured for the UE. If there is no valid downlink subframe for the CQI reference resource, CQI reporting is not performed in uplink subframe n.

In the layer region, the CQI reference resource is defined as a RI and PMI which the CQI presumes.

The following assumptions may be made for the UE to derive a CQI index on a CQI reference resource: (1) the first three OFDM symbols in a downlink subframe are used for control signaling; (2) there is no RE that is used by a primary synchronization signal, a secondary synchronization signal, or a PBCH; (3) CP length of a non-MBSFN subframe is given; (4) Redundancy version is 0; (5) If a CSI-RS is used for channel measurement, the ratio of PDSCH energy per resource element (EPRE) to CSI-RS EPRE has a predetermined value signaled by a higher layer; (6) a PDSCH transmission scheme (single antenna port transmission, transmission diversity, spatial multiplexing, MU-MIMO, etc.) defined for each transmission mode (e.g., a default mode) is currently set for the UE; (7) if the CRS is used for channel measurement, the ratio of PDSCH EPRE to CRS EPRE may be determined according to a predetermined requirement. For details related to definition of the CQI, see 3GPP TS 36.213.

In summary, the downlink receiver (e.g., a UE) may configure a specific single subframe of the past as a CQI reference resource with respect to the current time at which it is performing CQI calculation, and when a PDSCH is transmitted from the eNB on the CQI reference resource, may calculate a CQI value such that a condition that the error probability should not exceed 10% is satisfied.

CSI-Process

3GPP standard document describes the concept of a CSI process including a combination of one NZP CSI-RS resource for signal measurement and one CSI-IM resource for interference measurement for CSI feedback of a UE.

Specifically, one CSI process is defined as association of one NZP CSI-RS resource for measurement of a desired signal and one interference measurement resource (IMR) for interference measurement. Each CSI process has an independent CSI feedback configuration which refers to a feedback mode (CSI type (RI, PMI, CQI and the like) and CSI transmission order), a feedback period and offset.

One or more CSI-IM resource configurations may be provided for a UE. For each CSI-IM resource configuration, higher layer parameters such as a zero power (ZP) CSI-RS configuration (i.e., configuration information about an RE position to which a ZP CSI-RS is mapped) and ZP CSI-RS subframe configuration (i.e., configuration information about a ZP CSI-RS generation period and offset) may be set.

In addition, one or more ZP CSI-RS resource configurations may be provided for the UE. For each ZP CSI-RS resource configuration, higher layer parameters such as a ZP CSI-RS configuration list (i.e., 16-bit bitmap information about a ZP CSI-RS) and a ZP CSI-RS subframe configuration (i.e., configuration information about a ZP CSI-RS generation period and offset) may be set.

Furthermore, the UE may transmit UE capability signaling including the maximum number of CSI processes that the UE can support to an eNB and send one of P=1, P=3 and P=4 to the eNB.

When the UE transmits P=1 to the eNB as capability thereof, the UE notifies the eNB that the UE can process only a single CSI process, which means that DPS operation is impossible and interference measurement accuracy improvement using CSI-IM can be expected even in transmission mode 10. When the UE transmits P=3 or P=4 as capability thereof, the UE indicates that multipole CSI processes can be set and, in this case, the UE can perform DPS operation by receiving a CSI process information element from a higher layer and performing CSI feedback per CSI process.

Figure 12:
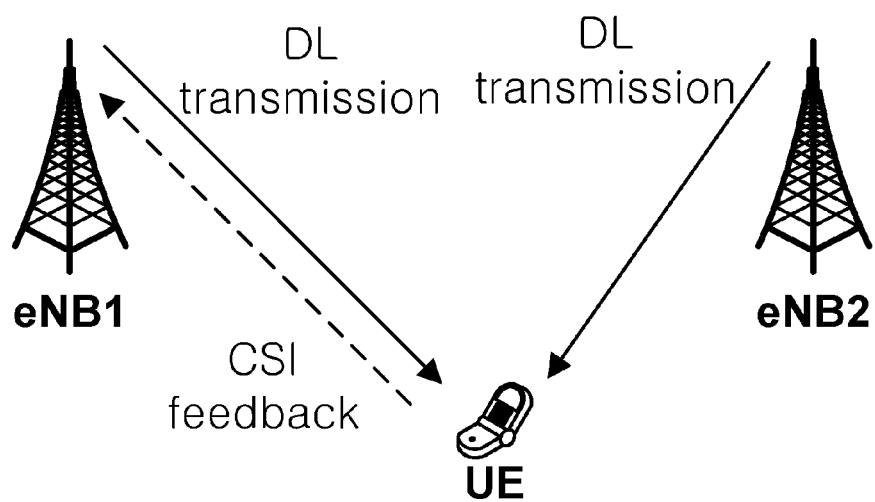
FIG. 12 illustrates downlink CoMP operation.

FIG. 12 illustrates downlink CoMP operation. A UE is located between eNB1 and eNB2 which perform CoMP operation (JT, DCS, DPB or CS/CB) in order to solve a problem with respect to interference applied to the UE. The UE feeds back CSI in order to support the CoMP operation of eNB1 and eNB2. The CSI feedback includes CSI, for example, RI, PMI and CQI, of each eNB and may additionally include channel information between the two eNBs for JT (e.g. phase offset information between two eNB channels).

The UE transmits the CSI feedback to eNB1 corresponding to a serving cell thereof. According to an embodiment, the UE may transmit the CSI feedback to eNB2 only or both eNB1 and eNB2. While a basic unit participating in CoMP is an eNB in the above description, CSI feedback can be applied to CoMP between transmission points (TPs) controlled by a single eNB. For CoMP scheduling, the UE feeds back not only downlink (DL) CSI of the serving eNB/TP but also downlink (DL) DL CSI of a neighboring eNB/TP participating in CoMP. To this end, the UE feeds back a plurality of CSI processes reflecting various data transmission eNBs/TPs and various interference environments. For example, three CSI processes as shown in Table 8 can be configured for the UE.

TABLE 8

| CSI process | Signal measurement resource (SMR) | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 8, CSI-RS 0 received from eNB1 which is the serving eNB and CSI-RS 1 is received from eNB 2 participating in CoMP.

TABLE 9

| IMR | eNB 1 | eNB 2 |
|---|---|---|
| IMR 0 | muting | Data transmission |
| IMR 1 | Data transmission | muting |
| IMR 2 | muting | muting |

As shown in Table 9, eNB1 performs muting and eNB2 performs data transmission in IMR 0, and the UE measures interference from eNBs other than eNB1 from IMR 0. eNB2 performs muting and eNB1 performs data transmission in IMR 1, and the UE measures interference from eNBs other than eNB2 from IMR 1. Both eNB1 and eNB2 perform muting in IMR 2, and the UE measures interference from eNBs other than eNB1 and eNB2 from IMR 2.

Accordingly, CSI of CSI process 0 indicates optimum RI, PMI and CQI when data is received from eNB1. CSI of CSI process 1 indicates optimum RI, PMI and CQI when data is received from eNB2. CSI of CSI process 2 indicates optimum RI, PMI and CQI when data is received from eNB1 and no interference is received from eNB2.

I. NIB Interface

I-1. CoMP Operations Over NIB Interface

In LTE-A, CoMP technique assumes that a backhaul link between TPs participating in CoMP transmission is an ideal backhaul having no delay. That is, since information exchange between TPs has no delay, determination/change/information exchange of dynamic scheduling per subframe are possible between the TPs. On the assumption of an ideal backhaul link, dynamic point selection (DPS) for enabling a PDSCH transmission point to be changed per subframe is supported. For example, to support DPS, when a DL grant is transmitted in DCI format 2D to a UE set to TM10, a 2-bit PDSCH RE mapping and quasi-co-location indicator (PQI) field in DCI is set to a specific state value. PDSCH RE mapping information about a PDSCH transmission point and information on QCL between RSs are dynamically provided through the PQI field.

However, when multiple TPs are connected through a non-ideal backhaul (NIB), CoMP using DSP is difficult to apply. For example, to schedule PDSCHG transmission from a neighboring TP using DCI 2D including the PQI field in the current subframe, such scheduling must be appointed between two TPs NIB delay (e.g., tens ms) in advance.

In the following embodiments, TP1 and TP2 are exemplified. It is assumed that TP1 is a serving TO or a serving cell of the current UE and TP2 is a neighboring TP or a neighboring cell participating in CoMP. However, such assumption is for convenience of description and the present invention is not limited thereto. In addition, TP1 and TP2 are not limited to downlink data transmission points and may operate as uplink data reception points. For example, TP1 and TP2, which transmit downlink data, can be referred to as reception point (RP) 1 and RP 2 in terms of uplink data reception.

According to an embodiment of the present invention, downlink or uplink CoMP transmission/reception methods considering backhaul delay, that is, NIB, between TPs are considered. Semi-static point muting (SSPM), semi-static point selection (SSPS) and coordinated beamforming (CB) may be considered as a downlink CoMP technique taking NIB into account. SSPM is set such that only a specific TP (e.g., serving TP1) transmits a PDSCH and TP2 mutes a predetermined time period and band through Xn-signaling. SSPS refers to a scheme in which TP2 semi-statically has the authority to transmit a PDSCH while a UE does not hand over from TP1 to TP2. CB refers to a scheme in which TP2 determines PMIs for UEs served thereby such that interference of TP2, which is applied to UEs served by TP1, is minimized.

A description will be given of semi-static point selection (SSPS) and joint reception (JR) as an uplink CoMP technique considering NIB according to embodiments of the present invention. A scrambling initialization parameter for generating PUCCH DMRS and/or PUSCH DMRS sequences may be set for a UE through RRC signaling for uplink SSPS.

Figure 13:
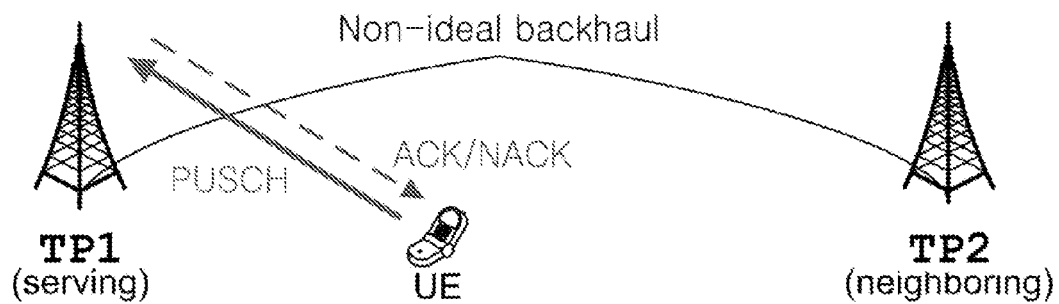
FIG. 13 illustrates uplink CoMP operation.

FIG. 13 illustrates uplink transmission and reception in non-CoMP. In FIG. 13, it is assumed that TP1 is a serving TP (or serving cell) of the UE and the UE transmits a PUSCH to TP1. Here, a PUSCH DMRS sequence for PUSCH transmission is generated by the physical cell ID of TP1. In other words, the PUSCH DMRS scrambling initialization parameter is set to the physical cell ID of TP 1.

In the case of synchronized HARQ operation, TP1 transmits ACK/NACK for a PUSCH transmitted from the UE through a PHICH after a predetermined time (e.g., 4 ms) from the PUSCH transmission from the UE. Upon reception of NACK through the PHICH, the UE retransmits the PUSCH after a predetermined time (e.g., 4 ms). TP1 may transmit a retransmission UL grant to the UE through DCI separately from ACK/NACK through the PHICH when transmitting ACK/NACK through the PHICH. In this case, retransmission of the PUSCH is triggered through the retransmission UL grant. For example, the UE can regard ACK transmitted thereto through the PHICH as stop or suspension of the HARQ process and retransmission. The UE may not retransmit the PUSCH unless the UE receives the retransmission UL grant from TP1 through DCI. If ACK/NACK through the PHICH and the retransmission UL grant are simultaneously received, the UE ignores ACK/NACK and performs HARQ operation according to the retransmission UL grant transmitted through the DCI. That is, the retransmission UL grant corresponds to conventional PHICH NACK and retransmission is performed according to the retransmission UL grant. If the retransmission UL grant is received along with new data indication (NDI) and an NDI bit has been toggled, this corresponds to conventional PHICH ACK and thus triggering of transmission of a new PUSCH can be defined.

When the UE is RRC-configured such that TP2 receives the PUSCH in uplink CoMP operation, PHICH ACK/NACK for the PUSCH needs to be transmitted by TP1 which is the downlink serving cell of the UE even when the PUSCH DMRS scrambling initialization parameter is set to the physical cell ID of P2. For example, TP1 transmits ACK/NACK received from TP2 through an NIB interface to the UE through a PHICH. In this case, it is impossible to conform to the limitation (e.g., PHICH ACK/NACK must be transmitted after a predetermined time (e.g., 4 ms) from PUSCH transmission of the UE) of the conventional synchronized HARQ process due to NIB delay (e.g., 4 ms or longer) required for TP2 to transmit ACK/NACK to TP1 through the NIB interface. For example, a problem is generated in the HARQ process in such a manner that although TP2 has transmitted ACK to TP1 through the NIB interface, the UE does not receive the ACK within a predetermined time and thus performs retransmission by considering no transmission of ACK/NACK as NACK, and TP1 transmits ACK through a PHICH after retransmission.

FIG. 13 illustrates transmission and reception of uplink data on the basis of SSPS according to an embodiment of the present invention. The present invention proposes a scheme in which TP2 instead of TP1 directly transmits ACK/NACK information to the UE when TP2 is configured to receive the PUSCH on the basis of SSPS (e.g., when the PUSCH DMRS scrambling initialization parameter is set to the physical cell ID of TP2 or the scrambling initialization parameter set to the UE is received by TP2 through NIB).

I-2. Xn-Signaling for CoMP Operations Over NIB Interface

Figure 14:
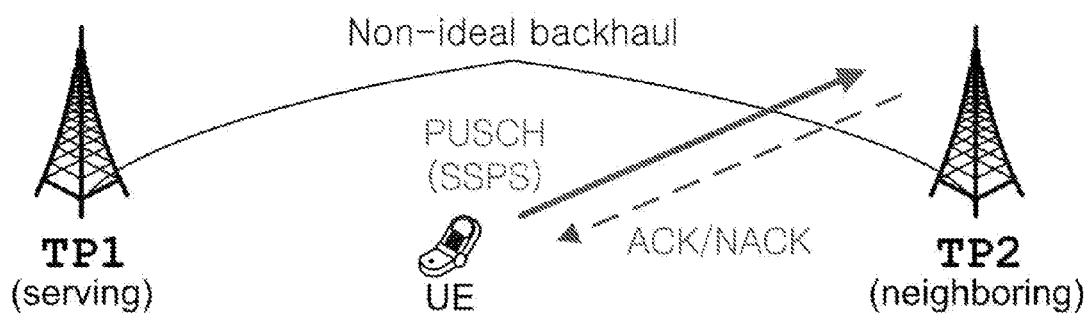
FIG. 14 illustrates an SSPS technique according to an embodiment of the present invention.

To enable TP2 participating in CoMP to directly transmit ACK/NACK information to the UE, as shown in FIG. 14, information exchange between TP1 and TP2 is needed before and after ACK/NACK transmission. Information exchange between TP1 and TP2 is performed through the NIB interface, which is referred to as Xn-signaling. The Xn-signaling may be X2-signaling which is a conventional signal exchange protocol between eNBs or a protocol newly defined for the present invention.

TP1 previously transmits PUSCH DMRS configuration (e.g., PUSCH DMRS scrambling initialization parameter) information which will be set or has been set for the UE to a central control node (CCN) which centrally controls other TPs or TPs participating in CoMP through Xn-signaling. Here, other TPs may refer to RPs which will receive the PUSCH or potential TP candidates which can receive the PUSCH by participating in CoMP and are assumed as TP2 for convenience of description. TP2 can receive a PUSCH DMRS, transmitted from the UE, using the PUSCH DMRS scrambling initialization parameter and decode the PUSCH using the PUSCH DMRS. Information about RRC configuration, transmitted by TP1 to TP candidates, is not limited to the PUSCH DMRS initialization parameter and other pieces of RRC configuration information can be transmitted.

Information that needs to be configured or reconfigured for a CoMP UE through RRC signaling is preferably exchanged between TPs through Xn-signaling before CoMP operation according to Xn-signaling is initiated because RRC signaling latency may be tens to hundreds of ms or more, which is greater than Xn-signaling latency (e.g., tens of ms). The information is preferably RRC-configured for the CoMP UE before initiation of SSPS.

II. SSPS

SSPS is a scheme in which a TP (e.g., serving TP1) operating as a serving cell hands over the authority to receive a PUSCH to TP2 without handing over the UE to TP2, as described above. Determination of TP2 which has the authority to transmit the PUSCH for an SSPS period can be determined according to whether spare traffic load is present, for example. A reception point of SSPS may be determined according to whether TP2 has higher channel quality than TP1. Channel qualities of TP1 and TP2 may be determined on the basis of CoMP feedback information about multiple CSI processes of the UE.

Explicit or implicit information for determining start and end points of SSPS may be exchanged between the TPs. The authority to transmit a PDSCH can be automatically returned to TP1 corresponding to the serving cell when the SSPS period is ended.

II-1. UL Grant

A UL grant for initial transmission or retransmission of a PUSCH can be transmitted by the serving TO or another TP participating in CoMP operation. For example, when a PUSCH RP is TP2, TP1 can transmit uplink acknowledgment through a legacy PDCCH or an EPDCCH of a specific EPDCCH set (e.g., EPDCCH set 1). Otherwise, TP2 may transmit uplink acknowledgment through an EPDCCH set (e.g., EPDCCH set 2) different from that used for TP1.

If TP1 transmits uplink acknowledgment, TP2 needs to able to previously obtain information about the UL grant through Xn-signaling. That is, TP1 of the CCN can transmit information about a UL grant transmission time and content of the UL grant to TP2 through Xn-signaling. Information about the content of the UL grant may be the entire UL grant information or include at least one of resource allocation (RA) information, PUSCH transmission subframe information, a DMRS cyclic shift (CS) configuration (3 bits), a modulation and coding scheme/redundancy version, NDI and precoding information. TP2 receives the PUSCH of the UE, which is transmitted according to the UL grant of TP1, on the basis of the information received form TP1. TP2 directly transmits ACK/NACL for the received PUSCH to the UE.

As described above, even when the PUSCH RP is TP2, a PUSCH scheduling entity is not always TP2. PUSCH scheduling may be performed by the CCN or TP1.

II-2. ACK/NACK on DCI

After a predetermined time from when TP2 corresponding to the PUSCH RP receives the PUSCH (e.g., after 4 ms), TP2 can directly transmit ACK/NACK to the UE. TP2 can transmit ACK/NACK through DCI (downlink control information) instead of a PHICH. ACK/NACK can be transmitted by newly defining a DCI format for TP2 to transmit ACK/NACK or adding only ACK/NACK to an existing format. For example, a new DCI format can be defined in such a manner that an N-bit (e.g., N=1) indicator field is included in an existing DCI format. In this case, the N-bit indicator field indicates ACK when N=1 and the field value is "0" and indicates NACK when N=1 and the field value is "1".

DCI of TP2 can be transmitted through a PDCCH or an EPDCCH. For example, a predetermined EPDCCH set (e.g., EPDCCH set 2) can be allocated for ACK/NACK transmission of TP2. When TP2 is configured to transmit ACK/

NACK through the DCI, the UE can determine whether to perform retransmission on the basis of the DCI instead of the PHICH.

ACK/NACK transmission using the DCI and activation/deactivation of a HARQ process based on the DCI can be semi-statically set through higher layer signaling (e.g., RRC signaling). For example, when activation is set through RRC signaling, the UE can ignore the PHICH until deactivation is set through RRC signaling. In an activation state, the UE can perform retransmission only when NACK is indicated through the DCI without monitoring the PHICH (e.g., by regarding the PHICH as ACK all the time).

II-2-(1). DCI Format Having ACK Indication and NDI Field

According to an embodiment of the present invention, the UE can receive a DCI format having both an ACK/NACK field and an NDI field. It is assumed that the ACK/NACK field indicates ACK. For example, when DCI format X transmitted from TP2 is a UL-related DCI format (e.g., DCI format 0 or 4), the ACK/NACK field indicates ACK (e.g., ACK/NACK field="0") and the NDI field indicates new data (e.g., NDI is toggled), the UE determines that the PUSCH previously transmitted thereby has been successfully received by a TP and initializes the corresponding HARQ process. In addition, the UE prepares transmission of new data through a PUSCH.

When the ACK/NACK field indicates ACK and the NDI field indicates retransmission (e.g., NDI is not toggled), the UE defers or suspends PUSCH retransmission. That is, the UE does not initialize the HARQ process and does not perform retransmission. The UE performs retransmission when uplink acknowledgment for retransmission is additionally received.

II-2-(2). DCI Format Having NACK Indication and NDI Field

According to another embodiment of the present invention, the UE can receive a DCI format having both the ACK/NACK field and the NDI field. It is assumed that the ACK/NACK field indicates NACK (e.g., ACK/NACK field="1").

In one embodiment, when TP2 sets the ACK/NACK field to NACK, TP2 must set the NDI field such that the NDI field indicates retransmission (e.g., NDI is not toggled). The UE performs retransmission after a predetermined time from when DCI format X is received (e.g., after 4 ms). If the NDI field received by the UE indicates new data (e.g., NDI is toggled), the UE processes DCI format X as an error. UE operation for reception of error DCI format X can be undefined.

II-2-(3). DCI Format Having ACK Indication without NDI Field

According to another embodiment of the present invention, the UE can receive a DCI format having only the ACK/NACK field without the NDI field. It is assumed that the ACK/NACK field indicates ACK. For example, when DCI format X transmitted by TP2 is a DL-related DCI format (e.g., DCI formats 1x, 2x and 3x other than DCI format 0/4), the DCI format does not include the NDI field.

Upon reception of DCI in the aforementioned format, the UE suspends or defers retransmission of the PUSCH. The UE does not initialize the HARQ process and does not perform retransmission until an additional UL grant for retransmission is received from TP2.

Operations indicated by fields other than the ACK/NACK field can be performed in the same manner as conventional operations. For example, the UE receives a PDSCH according to a DL grant included in the DCI in a subframe in which the DCI is received since information (e.g., DL PDSCH scheduling related information) other than the ACK/NACK field in DCI format X needs to be processed as in the conventional scheme. In this manner, TP1 or TP2 can suspend PUSCH retransmission by adding only the ACK/NACK field to the DCI transmitted to the UE.

II-2-(4). DCI Format Having NACK Indication without NDI Field

According to another embodiment of the present invention, the UE can receive a DCI format having only the ACK/NACK field without the NDI field. It is assumed that the ACK/NACK field indicates NACK The UE retransmits the PUSCH according to a predetermined HARQ process rule after a predetermined time from when the DCI is received (e.g., after 4 ms). For example, the predetermined HARQ process rule may be to perform retransmission using the same RA field and the same MCS value as those for initial PUSCH transmission or retransmission of the immediately previous PUSCH or to perform retransmission using an MCS value lower by one level. The HARQ process rule may be RRC-configured for the UE.

While the ACK/NACK field is 1 bit in the aforementioned embodiments, the ACK/NACK field may be N bits (N>1). For example, the ACK/NACK field size can be adjusted according to the number of transport blocks or layers.

III. Joint Reception

Figure 15:
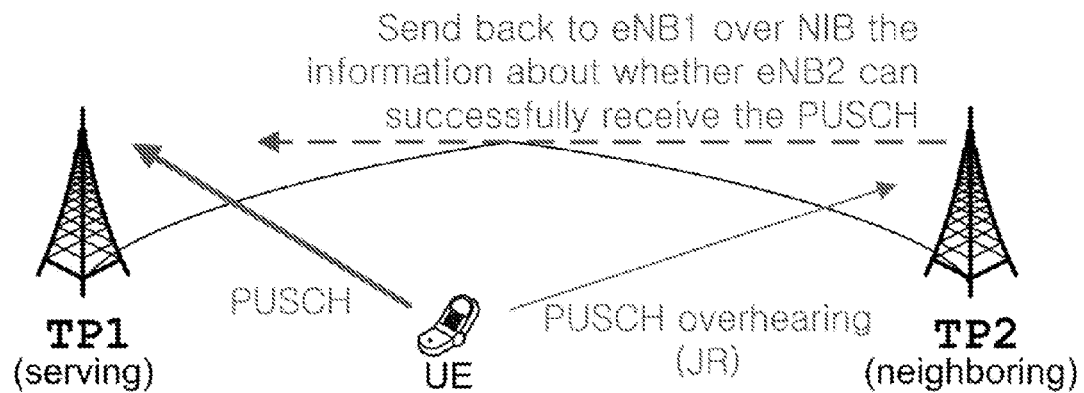
FIG. 15 illustrates a JR technique according to an embodiment of the present invention.

FIG. 15 illustrates reception of uplink data according to joint reception (JR) in an NIB environment. Although TP1, which is a serving TP, is a PUSCH RP, neighboring TPs (e.g., TP2) also monitor (overhear) the PUSCH. Redundant part of description corresponding to description of SSPS is omitted.

For example, TP2 previously acquires RRC configuration information necessary to overhear the PUSCH from TP1 through Xn-signaling. TP2 transmits an overheard PUSCH reception result to TP1 through Xn-signaling. JR combining of TP1 and TP2 in this manner can improve PUSCH reception performance.

In reception of the PUSCH by TP2, JR is similar to SSPS. Accordingly, TP1 transmits Xn-signaling information similar to that of SSPS to TP2 such that TP2 can receive the PUSCH. For example, TP1 previously transmits PUSCH DMRS configuration (e.g., PUSCH DMRS scrambling initialization parameter) information, which is RRC-configured or has been RRC-configured for the UE, to candidate TPs which can participate in CoMP or the CCN through Xn-signaling. The information about RRC configuration, transmitted from TP1 to the candidate TPs, is not limited to the PUSCH DMRS scrambling initialization parameter.

III-1. UL Grant

To receive the PUSCH, TP2 needs to know information about a UL grant for the PUSCH. Accordingly, TP1 transmits information about a UL grant transmission time and content of the UL grant to TP2 or the CCN through Xn-signaling prior to transmission of the UL grant to the UE. Accordingly, TP2 or the CCN can be aware of when TP1 transmits the UL grant and the type of the UL grant.

Information about the content of the UL grant may be the entire UL grant information or include at least one of resource allocation (RA) information, PUSCH transmission subframe information, a DMRS cyclic shift (CS) configuration (3 bits), a modulation and coding scheme/redundancy version, NDI and precoding information.

III-2. JR-Based PUSCH Reception

TP2 receives the PUSCH from the UE according to the UL Grant of TP1 on the basis of Xn-signaling information from TP1. TP2 feeds back a result of PUSCH reception based on JR to TP1 and/or the CCN through Xn-signaling. A description will be given of embodiments with respect to the result of PUSCH reception based on JR. The embodiments may be selectively performed or a plurality of embodiments may be combined and performed.

III-2-(1). Hard Decision

TP2 participating in JR receives the PUSCH independently of TP1. TP2 performs cyclic redundancy check for the PUSCH by demodulating and decoding the PUSCH. A CRC result is hard-decided as successful PUSCH reception and decoding or PUSCH reception and decoding failure. When successful PUSCH reception and decoding are determined from the CRC result, TP2 transmits information indicating that the PUSCH has been successfully received and decoded to TP1 and/or the CCN through Xn-signaling. TP2 can transmit the PUSCH which is determined to be successfully decoded from the hard decision to TP1 and/or the CCN through Xn-signaling.

When the CRC result indicates PUSCH reception and decoding failure, TP2 transmits information indicating PUSCH reception and decoding failure to TP1 and/or the CCN through Xn-signaling. Even in this case, TP2 can transmit the PUSCH which is determined not to be successfully decoded from the hard decision to TP1 and/or the CCN through Xn-signaling.

III-2-(2). Soft Decision

According to another embodiment, TP2 can transmit soft decision bit information indicating a result of demodulation and decoding of the received PUSCH to TP1 and/or the CCN. TP1 and/or the CCN can combine soft decision bit information received from two or more TPs so as to improve PUSCH reception performance.

III-2-(3). Hard/Soft Decision

According to another embodiment, hard decision and soft decision may be performed according to priority. For example, TP2 performs hard decision described in III-2-(1) first. If the CRC result indicates no error, TP2 transmits information indicating that the PUSCH has been successfully received and/or a hard decision result through Xn-signaling. When the CRC result indicates an error, TP2 transmits information indicating that the received PUSCH has an error and/or soft decision bits through Xn-signaling.

III-2-(4). Complex Symbol Stream

According to another embodiment, TP2 can transmit a demodulation result (e.g., bitstream) or a complex symbol stream immediately before demodulation to TP1 and/or the CCN. TP1 and/or the CCN can combine bitstreams or complex symbol streams received from two or more TPs so as to improve PUSCH reception performance.

III-2-(4). Hard/Soft Decision and Complex Symbol Stream

According to another embodiment, priority may be present among the aforementioned methods. For example, TP2 performs hard decision described in III-2-(1) first. If the CRC result indicates no error, TP2 transmits information indicating that the PUSCH has been successfully received and/or a hard decision result through Xn-signaling. Conversely, when the CRC result indicates an error, TP2 transmits information indicating that the received PUSCH has an error and/or the bitstream or complex symbol stream through Xn-signaling.

III-3. PUCCH

While above description focuses on reception of the PUSCH, the aforementioned embodiments may be applied to reception of a PUCCH. Xn-signaling information exchanged between TP1 and TP2 is determined according to a PUCCH format to be received by TP2.

III-3-(1). PUCCH Format 2

TP2 can receive PUCCH format 2 (or semi-static ACK/NACK) according to JR. TP1 previously transmits periodic CSI feedback configuration information (e.g., configured resources, periodicity, offset and the like), which is RRC-configured/has been RRC-configured for the UE, and/or semi-static ACK/NACK resource/periodicity/offset information to TP2 through Xn-signaling. In addition, TP1 previously transmits PUCCH sequence configuration information (e.g., PUCCH sequence scrambling initialization parameter), which is RRC-configured/has been RRC-configured for the UE, to TP2 through Xn-signaling.

III-3-(2). PUCCH Format 1/3

TP2 can receive PUCCH format 1 or 3 for dynamic ACK/NACK on the basis of JR. TP1 transmits information about a DL grant to TP2 which overhears a PUCCH of the UE according to the DL grant (with dynamic ACK/NACK) through Xn-signaling prior to transmission of the DL grant to the UE. For example, TP1 can transmit information about a DL grant transmission time and content of the DL grant to TP2 through Xn-signaling. The content of the DL grant may be the entire DL grant information transmitted to the UE or include at least one of resource allocation information and PDSCH transmission subframe information from among the DL grant information.

In addition, TP1 can transmit information about a time when the UE transmits a PUCCH included in dynamic ACK/NACK to TP2. For example, TP1 transmits at least one of PUCCH format and related information, n_CCE value, parameters determining PUCCH resources and PUCCH resource offset information to TP2 through Xn-signaling.

TP1 can previously transmit PUCCH sequence configurations, for example, a PUCCH sequence scrambling initialization parameter, to TP2 through Xn-signaling.

TP2 receives PUCCH format 1/2/3 through the aforementioned Xn-signaling information and feeds back information about a PUCCH reception result to TP1 and/or the CCN. A method of feeding back the PUCCH reception result may be substantially the same as the method of feeding back a PUSCH reception result and thus redundant description is omitted.

IV. Exemplary Embodiments

A description will be given of exemplary methods for transmitting and receiving uplink data according to SSPS or JR, exemplary TPs and an exemplary UE on the basis of the above description. The following embodiments are merely part of various embodiments supported by the above description and the scope of the present invention is not limited thereto. In the following, the aforementioned embodiments of the present invention may be independently applied or two or more thereof may be simultaneously applied, and redundant description is omitted.

Figure 16:
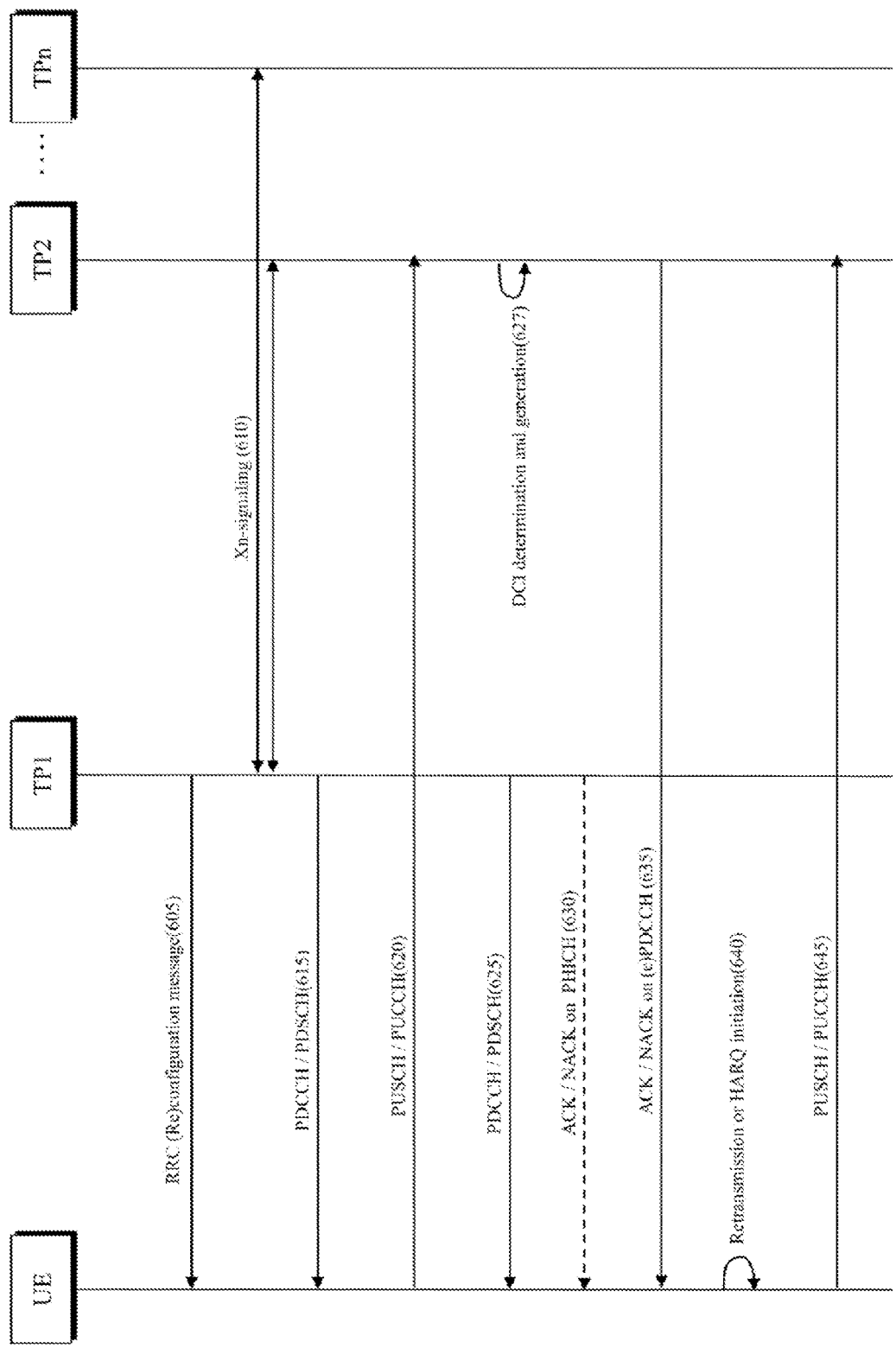
FIG. 16 illustrates a method for transmitting and receiving uplink data according to an embodiment of the present invention.

FIG. 16 is a flowchart illustrating a method for transmitting and receiving uplink data according to an embodiment of the present invention. While the exemplary method described with reference to FIG. 16 is represented by a series of operations for clarity, the serial operations do not limit the order of steps and the steps may be executed simultaneously or in different order as necessary. In addition, all steps illustrated in FIG. 16 are not necessary to implement the method proposed in the present invention.

Referring to FIG. 16, TP1 is a serving TP of a UE and TP2 to TPn are candidate TPs participating in SSPS operation. Accordingly, a total of n TPs including TP1 participate in SSPS operation. It is assumed that TP2 has the authority to receive a PUSCH for convenience of description.

TP1 transmits an RRC configuration or reconfiguration message to the UE through RRC signaling (605). The RRC configuration message according to an embodiment of the present invention may include parameters for PUSCH configuration. For example, the physical cell ID of TP2 can be included as the PUSCH DMRS sequence scrambling initialization parameter. In another embodiment, the physical cell ID of TP1 can be used as the PUSCH DMRS sequence scrambling initialization parameter and, in this case, the RRC configuration message may not include the PUSCH DMRS sequence scrambling initialization parameter.

TP1 transmits Xn-signaling information to TP2 (610). The Xn-signaling information may include information necessary to receive the PUSCH according to SSPS. For example, the Xn-signaling information can include the PUSCH DMRS sequence scrambling initialization parameter set to the UE. The Xn-signaling information may include information about PUSCH scheduling. The information about PUSCH scheduling may include information about a PUSCH transmission time (e.g., a time when a UL grant indicating PUSCH transmission is transmitted by TP1 or a subframe index corresponding to a subframe in which PUSCH transmission is performed and the like), resource allocation information for PUSCH transmission, DMRS cyclic shift configuration, MCS/RV, NDI and precoding information.

TP1 transmits a PDCCH and/or a PDSCH (615). The PDCCH includes a UL grant for PUSCH transmission.

TP2 receives a PUSCH and/or a PUCCH transmitted from the UE (620). That is, TP2 receives the PUSCH scheduled by TP1. While TP1 receives the PUSCH prior to initiation of SSPS, TP2 receives the PUSCH after initiation of SSPS. TP1 may hand over the authority to receive the PUSCH to TP2 and may not monitor the PUSCH.

Even when the authority to receive the PUSCH is handed over to TP2, TP1 is still the serving TP of the UE and thus TP1 has the authority to transmit downlink data. Accordingly, TP1 can transmit the PDCCH and the PDSCH to the UE even if SSPS is initiated (625). When an EPDCCH set is configured for the UE according to an embodiment of the present invention, TP1 can transmit a first EPDCCH and TP2 can transmit a second EPDCCH. In other words, TP2 may acquire the authority to transmit one of EPDCCHs included in the EPDCCH set from TP1. An EPDCCH set transmitted by TP2 can be used to control retransmission of a HARQ process, as described above.

TP2 determines and generates DL control information to be transmitted to the UE on the basis of a PUSCH reception result (627). For example, TP2 can determine a DCI format. When TP2 attempts to transmit a UL grant to the UE, TP2 can determine a UL related DCI format. The UL related DCI can include the ACK/NACK field and the NDI field. TP2 determines values of the ACK/NACK field and the NDI field on the basis of the PUSCH reception result. Refer to the aforementioned embodiments of a method for determining the values of the ACK/NACK field and the NDI field and UE operation according thereto.

TP2 transmits DCI including the ACK/NACK field to the UE through an (E)PDCCH (635). TP1 has the authority to transmit ACK/NACK through a PHICH since TP1 is still the serving TP. However, when TP2 transmits the ACK/NACK field through the DCI, the UE can ignore PHICH transmission of TP1.

The UE may determine whether to retransmit the PUSCH or to transmit new data on the basis of the DCI received from TP2 (640). The UE retransmits the PUSCH or transmits new data according to the determination result (645). Refer to II-2 for details.

Figure 17:
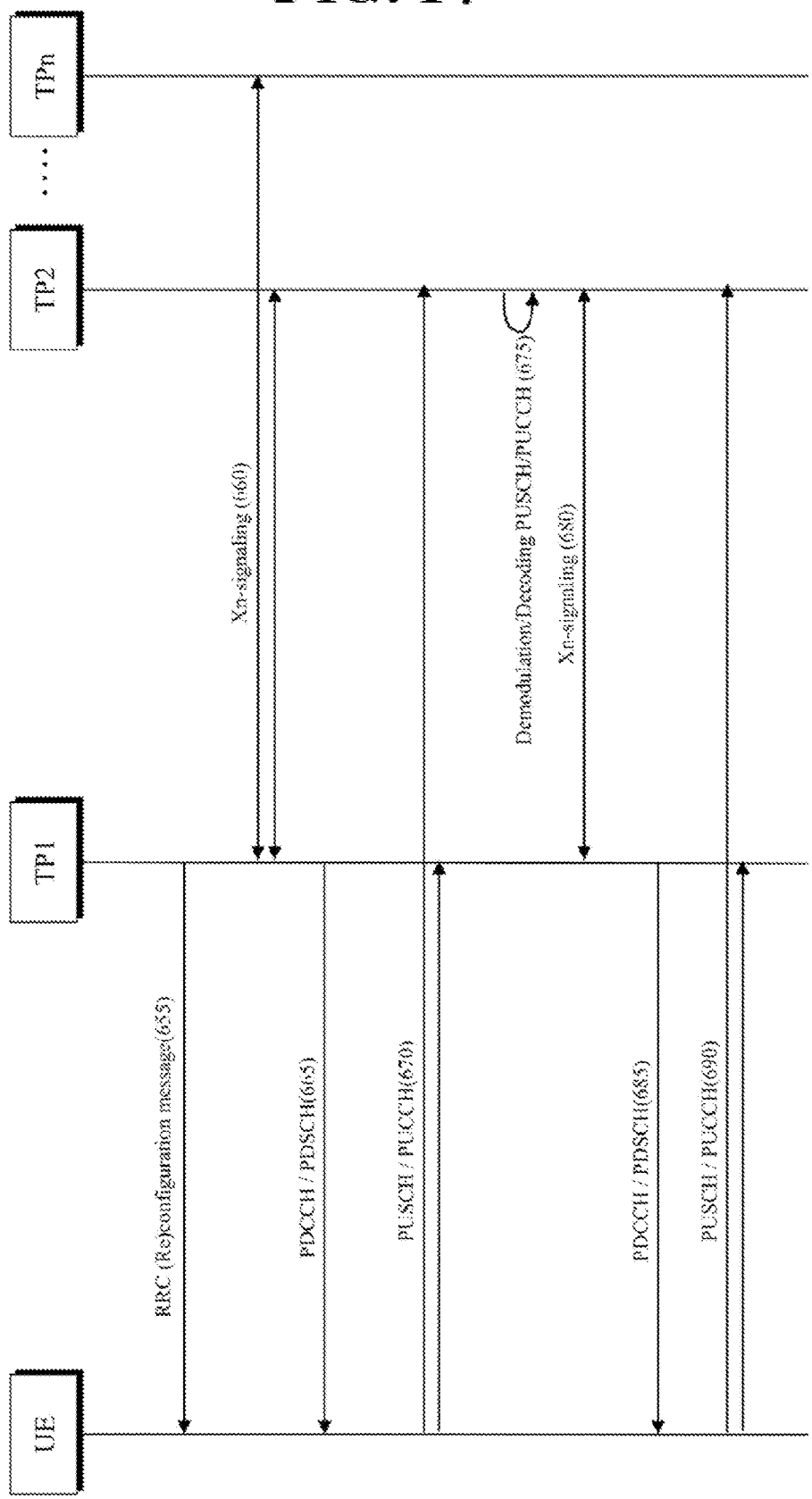
FIG. 17 illustrates a method for transmitting and receiving uplink data according to another embodiment of the present invention.

FIG. 17 is a flowchart illustrating a method for transmitting and receiving UL data according to another embodiment of the present invention. Description corresponding to FIG. 16 is omitted.

Referring to FIG. 17, TP1 is a serving TP of a UE and TP2 to TPn are candidate TPs participating in JR operation. Accordingly, a total of n TPs including TP1 participate in JR operation. It is assumed that TP1 and TP2 receive a PUSCH for convenience of description.

TP1 transmits an RRC configuration or reconfiguration message to the UE through RRC signaling (655). TP1 transmits Xn-signaling information to TP2 (660). The Xn-signaling information may include information necessary for TP2 to overhear the PUSCH.

TP1 transmits a PDCCH and/or a PDSCH (665). The PDCCH includes a UL grant for PUSCH transmission.

TP1 and TP2 receive a PUSCH and/or a PUCCH transmitted from the UE (670).

That is, both TP1 and TP2 receive the PUSCH scheduled by TP1.

TP2 demodulates and decodes the PUSCH received from the UE (675). TP2 transmits a PUSCH demodulation and decoding result to TP1 through Xn signaling (680). Refer to III-2 for more details about the PUSCH demodulation and decoding result.

TP1 determines whether the PUSCH needs to be retransmitted and ACK/NACK on the basis of the information received form TP2. TP1 transmits a PDCCH or a PHICH indicating whether the PUSCH needs to be retransmitted and the ACK/NACK to the UE (685). The UE transmits new data or retransmits the previous PUSCH according to instruction from TP1.

Figure 18:
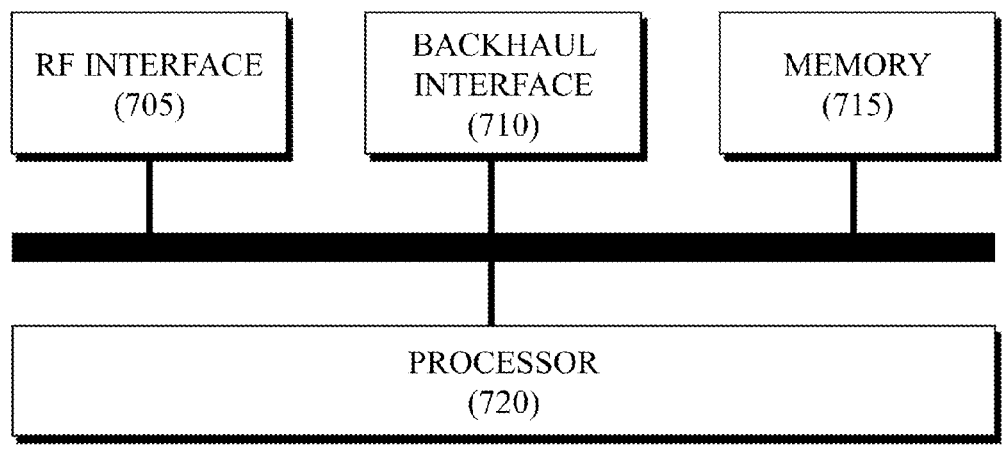
FIG. 18 illustrates a transmission point according to an embodiment of the present invention.

FIG. 18 illustrates a TP according to an embodiment of the present invention. TP 70 illustrated in FIG. 18 may operate as TP1 or TP2.

When the TP 70 serves as TP1, a processor 720 schedules PUSCH transmission of a UE served by TP1. A backhaul interface 710 transmits a message including at least part of the PUSCH transmission scheduling result to TP2. An RF interface 705 transmits DL control information including the PUSCH transmission scheduling result to the UE after the backhaul interface transmits the message. Here, the PUSCH of the UE, which is scheduled by TP1, is received by TP2 which has received the message transmitted from the backhaul interface. A memory 715 stores a program code executed by the processor 720.

When the TP 70 serves as TP2, the backhaul interface 710 receives information on a PUSCH DMRS configuration which is RRC-configured for a UE served by TP2. The backhaul interface 710 receives a scheduling result of PUSCH transmission of the UE. The RF interface 705 receives the PUSCH on the basis of the PUSCH transmission scheduling result. The processor 720 decodes the received PUSCH using the PUSCH DMRS configuration. The memory 715 stores program code executed by the processor 720.

Figure 19:
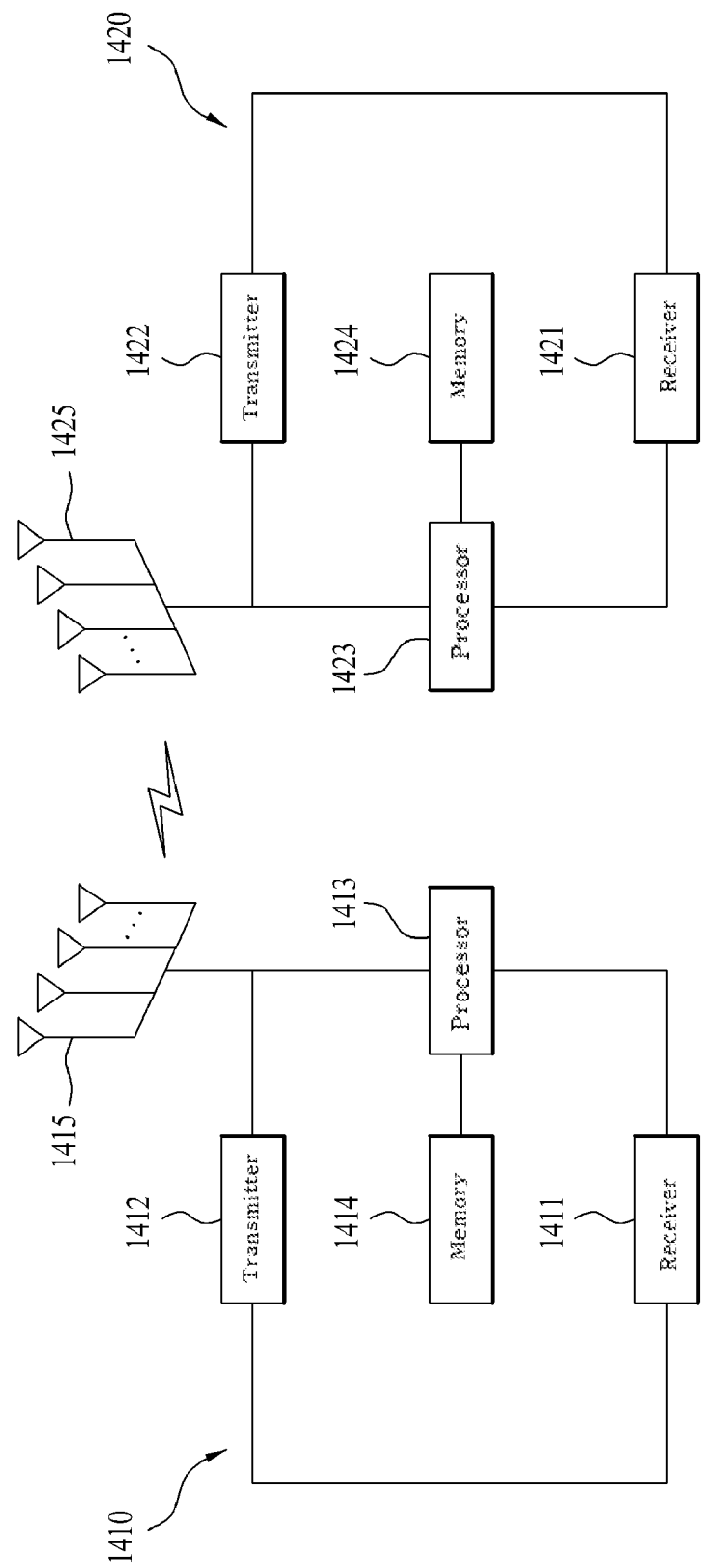
FIG. 19 illustrates a UE and a base station according to another embodiment of the present invention.

FIG. 19 illustrates a UE and an eNB according to an embodiment of the present invention. The UE and the eNB illustrated in FIG. 19 can perform operations of the UE and the eNB (or TP) according to the aforementioned embodiments. The eNB 1410 may include a reception module 1411, a transmission module 1412, a processor 1413, a memory 1414 and a plurality of antennas 1415. The multiple antennas 1415 indicate that the eNB supports MIMO transmission and reception. The reception module 1411 can receive various signals, data and information from the UE over uplink. The transmission module 1412 can transmit various signals, data and information to the UE over downlink. The processor 1413 can control the overall operation of the eNB 1410.

In addition, the processor 1413 of the eNB 1410 can process information received by the eNB 1410, information to be transmitted to the outside and the like and the memory 1414 can store the processed information for a predetermined time and may be replaced by a component such as a buffer (not shown).

The UE 1420 may include a reception module 1421, a transmission module 1422, a processor 1423, a memory 1424 and a plurality of antennas 1425. The multiple antennas 1425 indicate that the UE supports MIMO transmission and reception. The reception module 1421 can receive various signals, data and information from the eNB over downlink. The transmission module 1422 can transmit various signals, data and information to the eNB over uplink. The processor 1423 can control the overall operation of the UE 1420.

In addition, the processor 1423 of the UE 1420 can process information received by the UE 1420, information to be transmitted to the outside and the like and the memory 1424 can store the processed information for a predetermined time and may be replaced by a component such as a buffer (not shown).

The UE and the eNB having the aforementioned configurations may be implemented such that the above-described embodiments of the present invention can be independently applied or two or more thereof can be simultaneously applied, and redundant descriptions are avoided for clarity.

The above description of the eNB 1410 with reference to FIG. 19 may be equally applied to a relay node corresponding to a downlink transmission entity or an uplink reception entity and the description of the UE 1420 may be equally applied to a relay node corresponding to a downlink reception entity or an uplink transmission entity.

While an eNB is exemplified as a downlink transmission entity or an uplink reception entity and a UE is exemplified as a downlink reception entity or an uplink transmission entity in the embodiments of the present invention, the scope of the present invention is not limited thereto. For example, description of the eNB can be equally applied to a case in which a cell, an antenna port, an antenna port group, an RRH, a transmission point, a reception point, an access point or a relay node serves as an entity of downlink transmission to a UE or an entity of uplink reception from the UE. Furthermore, the principle of the present invention described through the various embodiments of the present invention can be equally applied to a case in which a relay node serves as an entity of downlink transmission to a UE or an entity of uplink reception from the UE or a case in which a relay node serves as an entity of uplink transmission to an eNB or an entity of downlink reception from the eNB.

The embodiments of the present invention may be implemented by various means, for example, hardware, firmware, software, or combinations thereof.

When the embodiments of the present invention are implemented using hardware, the embodiments may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention is not intended to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are to be embraced therein. Therefore, the present invention is not limited to the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments of the present invention can be applied to various mobile communication systems.

The invention claimed is:

1. A method of performing coordinated multi-point (CoMP) operation for receiving uplink data by a serving point, the method comprising:
    scheduling a physical uplink shared channel (PUSCH) transmission of a user equipment (UE) served by the serving point;
    transmitting a message including at least part of a result of scheduling the PUSCH transmission to a coordinated point;
    transmitting downlink control information including the result of scheduling the PUSCH transmission to the UE after transmitting the message;
    transmitting, to the coordinated point, information on a physical uplink control channel (PUCCH) transmission of the UE; and
    receiving, from the coordinated point, a result of the PUCCH transmission of the UE which is received by the coordinated point, wherein the PUSCH of the UE scheduled by the serving point is received by the coordinated point which has obtained the message, and wherein the serving point determines contents of the information on the PUCCH transmission based on whether the PUCCH transmission of the UE corresponds to a first PUCCH format for semi-static positive acknowledgement/negative acknowledgement (ACK/NACK) feedback or a second PUCCH format for dynamic ACK/NACK feedback.

2. The method according to claim 1, wherein the message includes at least one of a PUSCH transmission time, a subframe in which the PUSCH is transmitted, resource allocation for the PUSCH transmission, a modulation and coding scheme (MCS) of the PUSCH and precoding information of the PUSCH.

3. The method according to claim 1, further comprising:
transmitting, to the coordinated point, at least part of a PUSCH demodulation reference signal (DMRS) configuration,
wherein the PUSCH DMRS configuration is radio resource control (RRC) configured in the UE so as to transmit a PUSCH DMRS.

4. The method according to claim 3, wherein the transmitting of the at least part of the PUSCH DMRS configuration comprises transmitting a scrambling initialization parameter used to scramble a sequence of the PUSCH DMRS to the coordinated point.

5. The method according to claim 3, wherein the coordinated point decodes the PUSCH using the at least part of the PUSCH DMRS configuration received from the serving point.

6. The method according to claim 1, further comprising:
acquiring a PUSCH reception result of the coordinated point; and
combining the PUSCH reception result of the coordinated point with a PUSCH reception result of the serving point.

7. The method according to claim 6, wherein the PUSCH reception result of the coordinated point includes at least one of a result of cyclic redundancy check (CRC) of the PUSCH in the coordinated point, a result of decoding the PUSCH in the coordinated point according to a hard decision or a soft decision, and a complex symbol stream of the PUSCH received by the coordinated point.

8. The method according to claim 6, further comprising:
performing a hybrid automatic repeat request (HARQ) process based on a result of combining the PUSCH reception results.

9. A method of performing coordinated multi-point (CoMP) operation for receiving uplink data by a coordinated point, the method comprising:
receiving a physical uplink shared channel demodulation reference signal (PUSCH DMRS) configuration which is radio resource control (RRC) configured in a user equipment (UE) served by a serving point;
receiving a scheduling result of a PUSCH transmission of the UE;
receiving the PUSCH based on the scheduling result of the PUSCH transmission;
decoding the received PUSCH using the PUSCH DMRS configuration;
receiving, from the serving point, information on a physical uplink control channel (PUCCH) transmission of the UE; and transmitting, to the serving point, a result of the PUCCH transmission of the UE which is received by the coordinated point, wherein contents of the information on the PUCCH transmission are determined based on whether the PUCCH transmission of the UE corresponds to a first PUCCH format for semi-static positive acknowledgement/negative acknowledgement (ACK/NACK) feedback or a second PUCCH format for dynamic ACK/NACK feedback.

10. The method according to claim 9, further comprising:
transmitting a result of decoding the PUSCH to the serving point.

11. The method according to claim 10, wherein the transmitting of the result of decoding the PUSCH to the serving point comprises transmitting information indicating that the PUSCH has no error and a result of a hard decision of the PUSCH when the PUSCH is determined to have no error from a result of cyclic redundancy check (CRC) of the PUSCH.

12. The method according to claim 10, wherein the transmitting of the result of decoding the PUSCH to the serving point comprises transmitting information indicating that the PUSCH has an error and a result of a soft decision of the PUSCH or a complex symbol stream of the PUSCH when the PUSCH is determined to have an error from a result of cyclic redundancy check (CRC) of the PUSCH.

13. The method according to claim 9, further comprising:
determining at least one of an ACK/NACK field and a new data indication (NDI) field based on the result of decoding the PUSCH; and
transmitting downlink control information including at least one of the ACK/NACK field and the NDI field.

14. The method according to claim 13, wherein the determining of the at least one of the ACK/NACK field and the NDI field comprises:
determining that the ACK/NACK field indicates a NACK and maintaining a previous value of the NDI field when retransmission of the PUSCH is required;
determining that the ACK/NACK field indicates an ACK and maintaining the previous value of the NDI field or omitting the NDI field when a hybrid automatic repeat request (HARQ) process is to be stopped; and
determining that the ACK/NACK field indicates an ACK and toggling the NDI field when the PUSCH is correctly received.

15. A serving point for performing a coordinated multi-point (CoMP) operation for receiving uplink data, the serving point comprising:
a processor configured to schedule a physical uplink shared channel (PUSCH) PUSCH transmission of a user equipment (UE) served by the serving point;
a backhaul interface configured to:
transmit, to a coordinated point, a message including at least part of a result of scheduling the PUSCH transmission,
transmit, to the coordinated point, information on a physical uplink control channel (PUCCH) transmission of the UE, and
receive, from the coordinated point, a result of the PUCCH transmission of the UE which is received by the coordinated point; and
a radio frequency (RF) interface configured to transmit, to the UE, downlink control information including the result of scheduling the PUSCH transmission after transmitting the message, wherein the PUSCH of the UE scheduled by the serving point is received by the coordinated point which has obtained the message, and wherein the processor determines contents of the information on the PUCCH transmission based on whether the PUCCH transmission of the UE corresponds to a first PUCCH format for semi-static positive acknowledgement/negative acknowledgement (ACK/NACK) feedback or a second PUCCH format for dynamic ACK/NACK feedback.

16. A coordinated point for performing a coordinated multi-point (CoMP) operation for receiving uplink data, the coordinated point comprising:

a backhaul interface configured to:
  receive a physical uplink shared channel demodulation reference signal (PUSCH DMRS) configuration which is radio resource control (RRC) configured in a user equipment (UE) served by a serving point,
  receive a scheduling result of PUSCH transmission of the UE,
  receive, from the serving point, information on a physical uplink control channel (PUCCH) transmission of the UE, and
  transmit, to the serving point, a result of the PUCCH transmission of the UE which is received by the coordinated point;
a radio frequency (RF) interface configured to receive the PUSCH based on the scheduling result of the PUSCH transmission; and
a processor configured to decode the received PUSCH using the PUSCH DMRS configuration, wherein contents of the information on the PUCCH transmission are determined based on whether the PUCCH transmission of the UE corresponds to a first PUCCH format for semi-static positive acknowledgement/negative acknowledgement (ACK/NACK) feedback or a second PUCCH format for dynamic ACK/NACK feedback.

17. The method according to claim 1, wherein the first PUCCH format is a PUCCH format 2 of a long-term evolution (LTE) system, and the second PUCCH format is a PUCCH format 1 or 3 of the LTE system.

18. The method according to claim 17, wherein, when the PUCCH transmission of the UE corresponds to the PUCCH format 2, the information on the PUCCH transmission includes a semi-static ACK/NACK resource, a periodicity and an offset, and wherein, when the PUCCH transmission of the UE corresponds to the PUCCH format 1 or 3, the information on the PUCCH transmission includes a transmission timing of a corresponding downlink grant.

19. The method according to claim 17, wherein the information on the PUCCH transmission includes a PUCCH format indication.

* * * * *